United States Patent
Nakata et al.

(10) Patent No.: US 6,931,208 B2
(45) Date of Patent: Aug. 16, 2005

(54) CAMERA WITH AN EXPOSURE CONTROL FUNCTION

(75) Inventors: Koichi Nakata, Kokubunji (JP); Takahiro Doi, Hachioji (JP); Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/996,011

(22) Filed: Nov. 22, 2004

(65) Prior Publication Data

US 2005/0074232 A1 Apr. 7, 2005

Related U.S. Application Data

(62) Division of application No. 10/660,074, filed on Sep. 11, 2003, now Pat. No. 6,853,806.

(30) Foreign Application Priority Data

| Sep. 13, 2002 | (JP) | ........................... | 2002-268732 |
| Sep. 18, 2002 | (JP) | ........................... | 2002-271816 |
| Nov. 5, 2002 | (JP) | ........................... | 2002-321314 |

(51) Int. Cl.$^7$ .............................................. G03B 7/08
(52) U.S. Cl. ..................................... 396/123; 396/234
(58) Field of Search .................. 396/61, 100, 121–123, 396/165, 233, 234; 348/362–366, 370, 371

(56) References Cited

U.S. PATENT DOCUMENTS 4,664,495 A * 5/1987 Alyfuku et al. ............. 396/234

| 5,128,707 | A | 7/1992 | Muramatsu |
| 5,258,803 | A | 11/1993 | Hayakawa |
| 6,040,860 | A | 3/2000 | Tamura et al. |
| 6,195,509 | B1 | 2/2001 | Nakahara |
| 6,215,961 | B1 | 4/2001 | Mukai et al. |
| 2004/0047621 | A1 | 3/2004 | Shimizu et al. |

FOREIGN PATENT DOCUMENTS

| JP | 7-27151 B2 | 3/1995 |
| JP | 8-107519 A | 4/1996 |
| JP | 10-079887 A | 3/1998 |
| JP | 11-032236 A | 2/1999 |
| JP | 2934712 B2 | 6/1999 |
| JP | 2001-311867 A | 11/2001 |
| JP | 2002-044510 A | 2/2002 |

* cited by examiner

Primary Examiner—W. B. Perkey
(74) Attorney, Agent, or Firm—Frishauf, Holtz, Goodman & Chick, P.C.

(57) ABSTRACT

A camera is provided which includes a backlight judgment section which determines whether the photographic scene is backlit by comparing the average luminance of the entire photographic screen obtained by photometry with the luminance of the main subject at a distance-measuring point selected by distance measurement. The camera performs suitable exposure control accompanied by illumination, such as supplementary light, at the time of exposure in a photographic scene where the main subject is against light.

8 Claims, 27 Drawing Sheets

CAMERA WITH AN EXPOSURE CONTROL FUNCTION

CROSS-REFERENCE TO RELATED APPLICATIONS

The present application is a divisional application of U.S. application Ser. No. 10/660,074, filed Sep. 11, 2003, now U.S. Pat. No. 6,853,806, which is based upon and claims the benefit of priority from the prior Japanese Patent Applications No. 2002-268732, filed Sep. 13, 2002; No. 2002-271816, filed Sep. 18, 2002; and No. 2002-321314, filed Nov. 5, 2002, the entire contents of all of which are incorporated herein by reference.

BACKGROUND OF THE INVENTION

1. Field of the Invention

This invention relates to a camera which performs correct exposure control by determining whether the subject is against light at the time of measuring the brightness of the subject, and also to a technique of processing image data in cameras.

2. Description of the Related Art

In a scene where the main subject is photographed against light or backlit as when there is a light source, such as the sun, behind the main subject, the shady part of the main subject is photographed, with the result that the main subject collapses in black.

To prevent this, the shady part of the main subject is lighted by the reflected light from a reflecting plate or illuminating light. Alternatively, when a picture is taken, strobe light is caused to emit light, that is, daylight synchronized flash is done.

In making a decision on backlighting, if the area occupied by the main subject is large for the photographic screen, it is easy to make a decision. However, in a photographic scene where the area occupied by the main subject is small, the luminance difference becomes smaller, which can cause a case where it cannot be determined that the subject is against light. To overcome this problem, for example, Jpn. Pat. No. 2934712 has disclosed an exposure control method of additionally providing a focal point detecting section (distance measuring section) to the photometric section for measuring the brightness in the middle of and the periphery of the photographic screen.

In the invention of Jpn. Pat. No. 2934712, the backlit state of the main subject is detected with a distance-measuring sensor. For example, in a photographic scene as shown in FIG. 3, the distance measuring sensor sets only region 33b as the distance measuring range in the area of the photographic screen 34T.

Furthermore, concerning a method of preventing improper exposure in a backlit photographic scene, a related technique has been disclosed in, for example, Jpn. Pat. Appln. KOKOKU Publication No. 7-27151. In this method, a camera capable of measuring the brightness and distance in a plurality of areas on the photographic screen selects one of the areas on the basis of the distance-measuring data. The photometric value in the selected area is compared with the maximum one of the photometric data in the other areas, thereby making a decision on backlighting. When it is determined that the photographic scene at that time is against light, daylight synchronized flash has been done.

Moreover, in a digital camera, when a backlit scene is not subjected to a suitable image process, the resulting image is unnatural and unattractive. For instance, the contour of the main subject deforms due to the spread of light, which makes it difficult to reproduce a natural image.

To overcome this problem, for example, Jpn. Pat. Appln. KOKAI Publication No. 8-107519 or Jpn. Pat. Appln. KOKAI Publication No. 11-32236 has disclosed the technique for analyzing the luminance distribution of the image data obtained by the imaging element by use of a histogram or the like to detect backlighting and changing the image processing method. Those techniques are for balancing the brightness of the main subject with the brightness of the background, making use of the photographed images.

BRIEF SUMMARY OF THE INVENTION

According to an aspect of the present invention, there is provided a camera comprising: a sensor array which detects an image signal of a subject existing in a specific position on a photographic screen and has a plurality of sensors; a computing section which calculates the average value of the outputs of a part of the plurality of sensors in the sensor array; an average photometric sensor which detects the average brightness at the photographic screen; an average luminance computing section which calculates the average luminance value at the photographic screen on the basis of the output of the average photometric sensor; and a subject state judgment section which determines the state of the subject by comparing the average value of the sensor outputs with the average luminance value and a judgment section which determines exposure control during photographing on the basis of the average luminance value and the results of the determinations at the subject state judgment section.

According to another aspect of the present invention, there is provided a camera comprising: a sensor array which detects at image signal of a subject existing in a specific position on a photographic screen and has a plurality of sensors; a computing section which calculates the average value of the outputs of a part of the plurality of sensors in the sensor array; an average photometric sensor which detects the average brightness of visible light at the photographic screen; an average luminance computing section which calculates the average luminance value at the photographic screen on the basis of the output of the average photometric sensor; an infrared photometric sensor which detects an infrared luminance value indicating the brightness of the average infrared light at the photographic screen; a subject state judgment section which determines the state of the subject by comparing the average value of the sensor outputs with the average luminance value; a subject field state judgment section which determines the state of a subject field including the subject by comparing the average luminance value with the infrared luminance value; and an exposure control determining section which determines exposure control during photographing on the basis of the average luminance value and the results of the determinations at the subject state judgment section and the subject field state judgment section.

According to still another aspect of the present invention, there is provided a camera comprising: a photometric section which measures the subject luminance in a plurality of areas on a photographic screen; a distance-measuring section which measures the subject distance in a plurality of areas on the photographic screen; a first select section which selects one from a plurality of distance-measuring areas on the photographic screen on the basis of the distance-measuring data about each distance-measuring area; a second select section which selects one from the photometric area corresponding to the distance-measuring area selected by the first select section and its adjacent photometric areas on the basis of the photometric data about each photometric area; and a backlight judgment section which makes a decision on backlighting by comparing the photometric data about the photometric area selected by the second select section with the photometric data about each photometric area.

According to still another aspect of the present invention, there is provided a camera comprising: an imaging section which detects a subject image signal; a backlighting state judgment section which determines whether the subject is against light; a strobe unit which emits strobe light onto the subject on the basis of the result of the decision on backlighting at the backlighting state judgment section; and an image processing section which compares the brightness of the subject with that of the background when the strobe unit emits the strobe light onto the subject, changes the amount of correction by a gamma conversion process or a contour emphasizing process on the basis of the result of the comparison, and processes the image of the subject image signal detected by the imaging section.

DETAILED DESCRIPTION OF THE INVENTION

Hereinafter, referring to the accompanying drawings, embodiments of the present invention will be explained.

Figure 1:
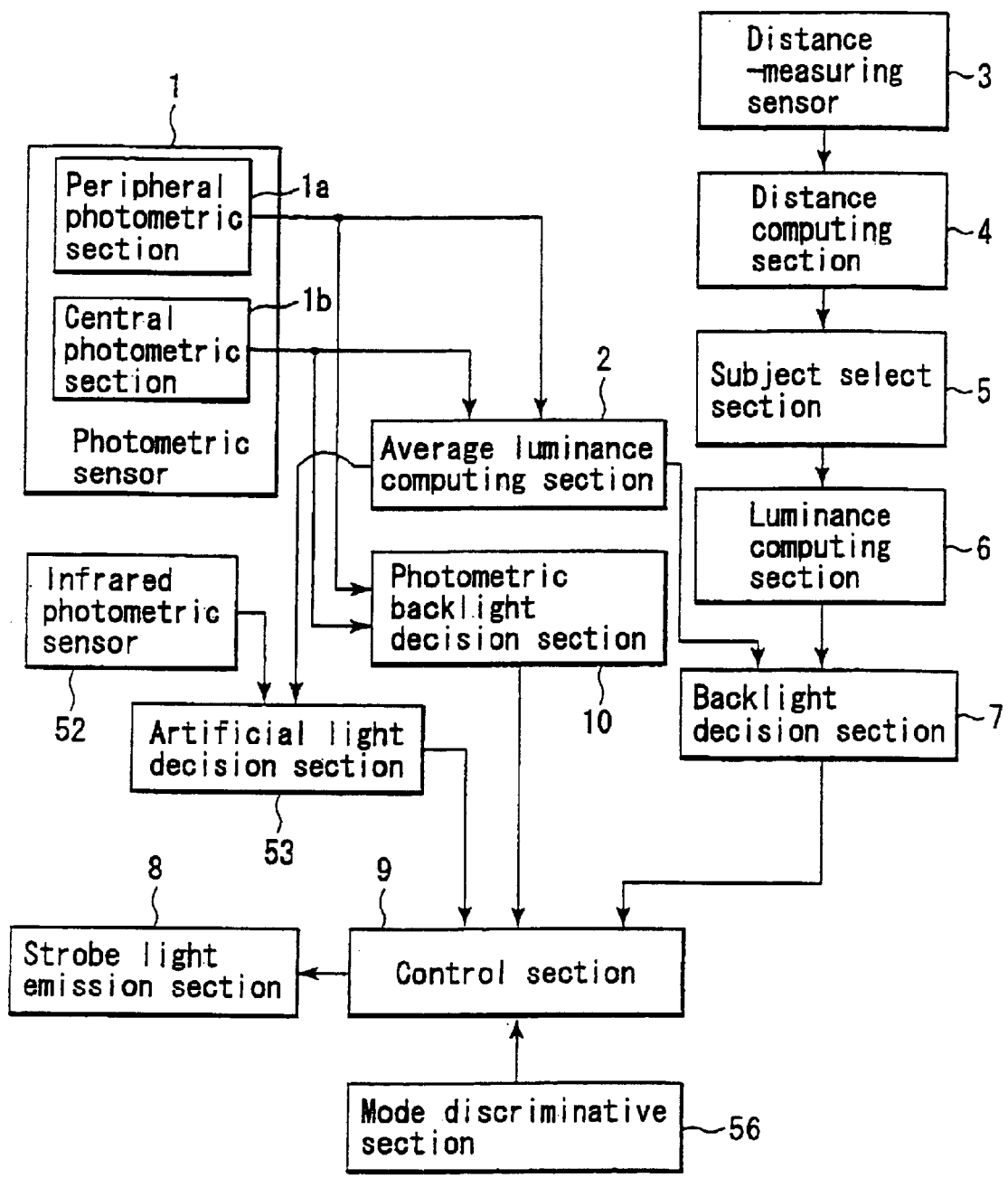
FIG. 1 shows a schematic configuration of the exposure control system of a camera related to a first to a third embodiment of the present invention.

The basic idea of making a decision on backlighting with the exposure control system of a camera related to the first embodiment of the present invention will be explained by reference to FIG. 1.

The exposure control system includes the component parts explained below.

The exposure control system includes a photometric sensor (AE sensor) 1 for determining the luminance (photometric value) in visible light on the entire photographic screen, an average luminance computing section 2 for determining the average luminance of the entire screen from the obtained photometric value, a distance-measuring sensor 3 for performing a distance-measuring operation on a plurality of distance-measuring points on the photographic screen, and a distance computing section 4 for determining the distance to the subject from the distance-measuring data obtained in the distance-measuring operation. The exposure control system further includes a subject select section 5 for setting, for example, the one existing at the closest distance as the main subject from the results of measuring the distance and selecting the position of the main subject as a distance-measuring point (hereinafter, referred to as a point) on the photographic screen. The exposure control system further includes a luminance computing section 6 for computing the quantity (luminance) of light entering the selected point, a backlight judgment section 7 for determining the state of the subject from the luminance of the selected point and the average luminance, a strobe light emission section 8 for emitting supplementary light during backlighting, an infrared photometric sensor 52 for receiving by remote control and determining the luminance of infrared light of the entire photographic screen, an artificial light judgment section 53 for determining the state of the field including the luminance of the infrared light and the average luminance, a mode discriminative section 56 for discriminating the present photographic mode set by a mode change section 55 explained later, and a control section 9 for determining exposure control in photography including strobe light emission control.

The light-receiving face of the photometric sensor 1 is separated into a peripheral photometric section 1a and the central photometric section 1b. In the embodiment, the backlight judgment section 7 serving as subject state decision means determines whether the subject is against light or backlit. The artificial light judgment section 53 serving as subject field state decision means determines whether the light source of the subject field is artificial.

The exposure control system further includes a photometric backlight judgment section 10 for making a decision on backlighting by comparing the individual outputs of the divided photometric sensor sections. The decision on backlighting is effective when the main subject exists in the middle of the photographic scene. The artificial light judgment section 53, which determines whether the light source is of natural light or artificial light (for example, incandescent lamp light or fluorescent lamp light), compares the output of the infrared photometric sensor 52 with the output of the average luminance computing section 2. When the subject 27 exists under artificial light, the artificial light judgment section 53 serves to prevent color seepage by artificial light (for example, green seepage under fluorescent lamp light).

When the exposure control system is actually constructed of the average luminance computing section 2, distance computing section 4, subject select section 5, luminance computing section 6, backlight judgment section 7, control section 9, photometric backlight judgment section 10, and artificial light judgment section 53, the control and computing processes are realized by a single microcomputer (CPU).

In the exposure control system, the exposure operation is started by the turning on of the release switch or the like of the camera (not shown). First, the photometric sensor 1 and infrared photometric sensor 52 measure brightness. From the resulting photometric values, the average luminance computing section 2 determines the average luminance of visible light and the luminance of infrared light on the entire screen.

Next, the distance-measuring sensor 3 measures the distance to each of the points on the photographic screen one after another. Using the resulting distance-measuring data, the distance computing section 4 determines the distance to the subject at each point. The subject select section 5 determines the closest one of the subject distances at the individual points to be the point where the main subject is present and selects the point as a point to be focused on. The luminance computing section 6 monitors and finds the luminance of the selected point.

Next, the backlight judgment section 7 compares the average luminance of the entire screen with the luminance of the selected point, thereby determining whether the photographic scene is against light. If the average luminance of the entire screen is higher than the luminance of the selected point, the backlight judgment section 7 determines that the surroundings are brighter than the main subject, that is, the main subject is against light. Furthermore, the artificial light judgment section 53 compares the luminance of infrared light on the entire screen with the luminance of visible light at the average luminance computing section 2, thereby determining whether the subject is in artificial light. To photograph a scene against light and a scene illuminated with artificial light, strobe light is emitted according to the ISO sensitivity of the photographing medium (such as the imaging element or film), the aperture value, and the distance to the subject. In this way, a decision on backlighting is made on the basis of the brightness of the selected point (the position of the main subject) and the brightness of the entire screen and color seepage by artificial light is prevented, which enables proper exposure control. When the average luminance is lower than the luminance of the point, it is determined that the main subject is not against light, with the result that exposure control is performed suitably without emitting strobe light.

Figure 2:
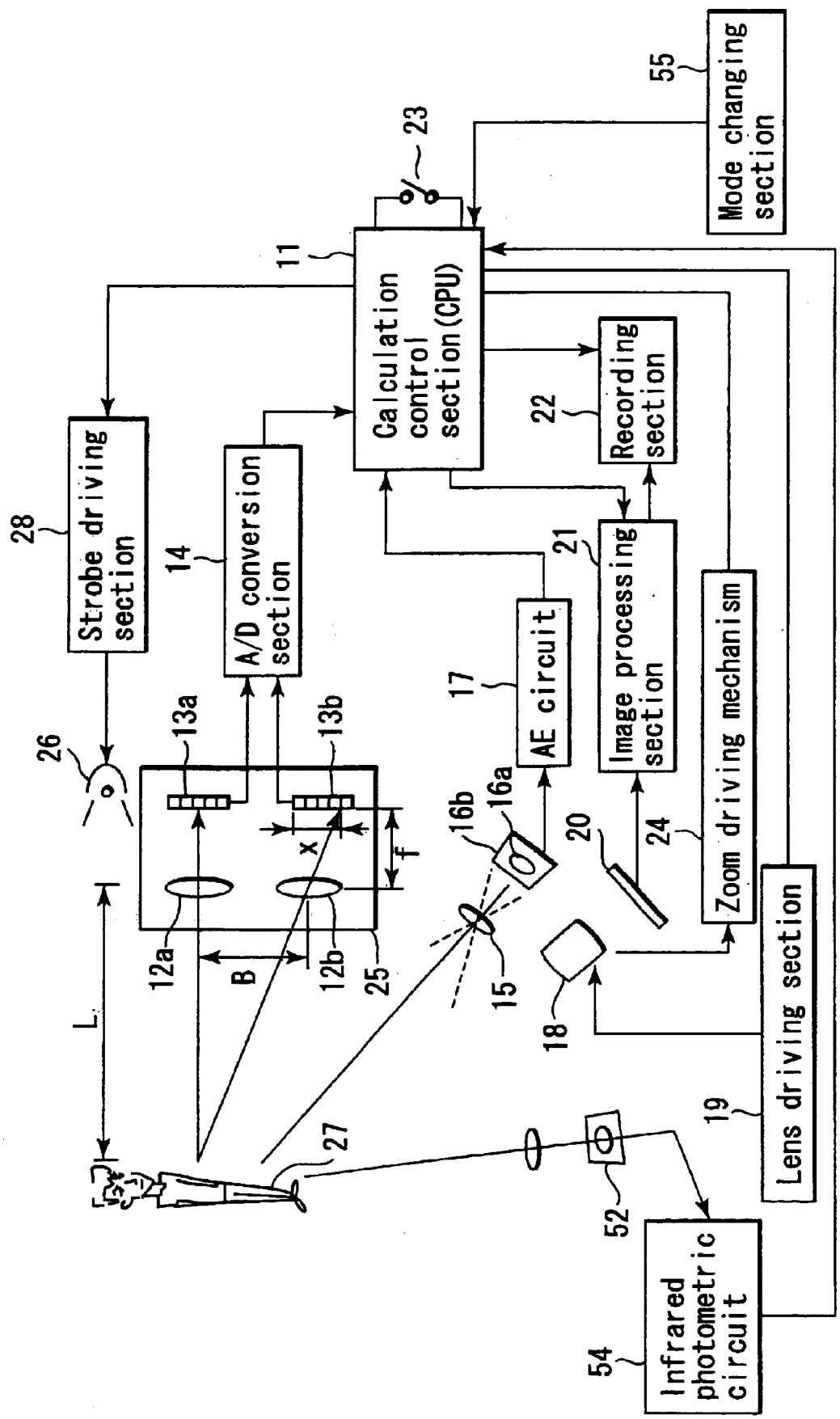
FIG. 2 shows a concrete configuration provided on the camera of the first embodiment.

FIG. 2 shows a concrete configuration of the electronic circuit system of a camera as a first embodiment to which the exposure control system of the present invention is applied. The camera of the first embodiment is a digital camera that converts the subject image into image data with a photoelectric conversion element, carries out various image processes, and records the resulting data.

The camera is roughly composed of a photometric distance-measuring system, an image pickup optical system, and an imaging system. A calculation control section (CPU) 11, which controls the entire camera, is composed of a one-chip microcomputer or the like.

The photometric distance-measuring system includes a distance-measuring section 25 for measuring the distance to a subject 27, an A/D conversion section 14 for A/D converting the subject image signal from the distance-measuring section 25 and outputting a digital image signal, split-type sensors 16a, 16b for receiving the light gathered by an AE lens 15, and an AE circuit 17 which is composed of a logarithmic compression circuit and others and measures the brightness of the inside of the photographic screen. The distance-measuring section 25 is composed primarily of two light-receiving lenses 12a, 12b provided the base length B away from each other, and a pair of sensor arrays 13a, 13b for receiving the subject image formed by the lenses 12a, 12b and generating subject image signal by photoelectric conversion.

The image pickup optical system is composed of a photographic lens (zoom lens) 18 for forming an image of the subject, a lens driving mechanism (LD) 19 for driving the photographic lens 18 to bring the camera into focus, and a zoom driving mechanism 24 for changing the angle of coverage by moving the lens barrel. The imaging system includes an imaging element (CCD) 20 for-creating image data on the basis of the image of the subject formed by the photographic lens 18, an image processing section 21 for subjecting the image data obtained from the imaging element 20 to image processes, including γ conversion and image compression, and a recording section 22 for recording the image data subjected to image processing.

The imaging system further includes a switch input section (release switch) 23 for starting a specific sequence in the calculation control section 11 in response to the operation of the photographer, a strobe emitting section 26 for emitting supplementary illumination light onto the subject 27, a strobe driving section 28 for performing driving control of the strobe emitting section 26, an infrared photometric circuit 54 for receiving the signal from an infrared remote control and detecting the infrared light component from the subject 27, and a mode changing section 55 for selectively setting the desired one of, for example, the aperture-value priority mode, shutter-speed priority mode, strobe forced-emission mode, strobe OFF mode, spot photometric mode, and infinite mode.

As for the component parts of the camera, only the members related to the subject matter of the first embodiment of the present invention are described. Explanation of the other component parts an ordinary camera has, such as the finder, will be omitted, because they are supposed to be included.

The two light-receiving lenses 12a, 12b provided the base length B apart gather light, which is then converted photoelectrically by a pair of sensor arrays 13a, 13b and further A/D converted by A/D conversion section 14. The A/D conversion section 14 produces a pair of digital image signals from a pair of analog signals produced by the pair of sensor arrays 13a, 13b. The CPU 11 compares the digital signals, thereby determining the relative positional difference x between the image input positions.

Figure 3:
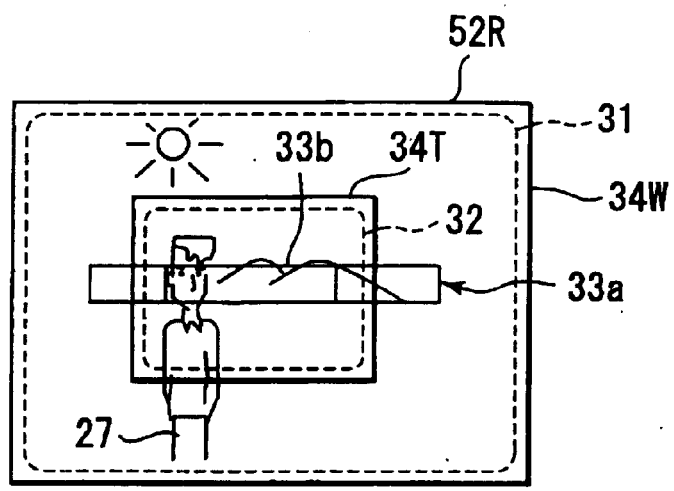
FIG. 3 shows the relationship between the photographing area and the distance-measuring area on the photographic screen.
Figure 4A:
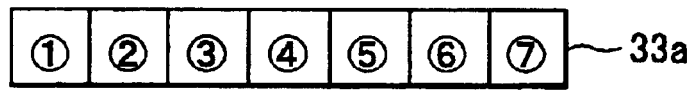
FIGS. 4A, 4B, 4C, and 4D show the arrangement of distance-measuring points (areas) and light-receiving areas, and an example of obtained image data.

Since the subject distance L, the focal length f is of the light-receiving lens, and the base length B vary in such a manner that they fulfill the equation x=B·f/L as shown in FIG. 2, detecting x enables the focusing distance L to be calculated. Since the sensor arrays are extended horizontally, when a photographic scene as shown in FIG. 3 is aimed at, the area 33a is monitored. The area 33a is divided into seven blocks as shown in FIG. 4A and the aforementioned detection is carried out using the image signal of each block, which enables the distance of seven points on the screen to be measured. Of the seven results of measurements, for example, the closest distance is determined to be the main subject distance.

Figure 4B:
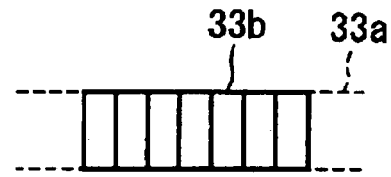
Figure 4C:
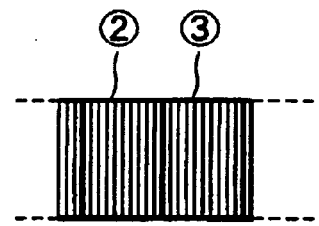

When the photographic lens 18 is a zoom lens, the angle of view is turned to the telephoto side, which enables only the photographic area 34T on the screen in the photographic scene shown in FIG. 3 to be photographed. At this time, if the distance-measuring area continues to be area 33a, things outside the screen are also measured in distance. Therefore, in the telephoto mode, the distance-measuring area is narrowed to area 33b. As shown in FIG. 4B, multipoint AF (multi-AF) of seven points in the seven narrowed areas is carried out. The AE circuit 17 and sensor arrays 16a, 16b measure the brightness of visible light on the entire screen. On the basis of the result of the measurement, the CPU 11 performs exposure control. In the sensor arrays 16a, 16b, the output of the sensor array 16a, or the area (in the telephoto mode) 32 shown in FIG. 3, is selected in the telephoto mode according to a change in the angle of view caused by the zooming of the photographic lens. In the wide angle mode, the sum of the outputs of the sensor arrays 16a, 16b, or the area (in the wide angle mode) 31 is selected and photometry is performed. Furthermore, the infrared photometric sensor 52 and infrared photometric circuit 54 measure the luminous intensity of infrared light on the entire screen (photometric range 52R).

Figure 4D:
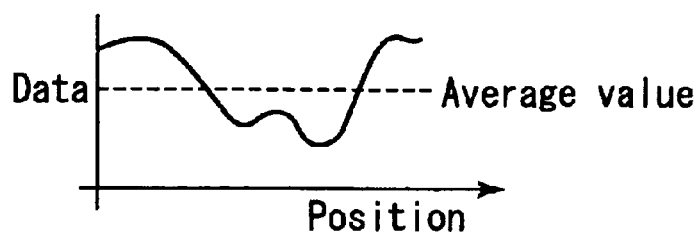

Each of the septsected distance-measuring points shown in FIGS. 4A and 4B is composed of rectangular pixels arranged in a plurality of columns. Since each pixel outputs data according to the shade of the image, image data as shown in FIG. 4D is obtained. By averaging the image data from the individual pixels, the average luminance of each point is determined. Use of multi-AF enables the position of the main subject to be detected and further the luminance at the position to be determined, which makes it possible to photograph by exposure control putting stress on the main subject, according to a flowchart shown in FIG. 5.

Figure 5:
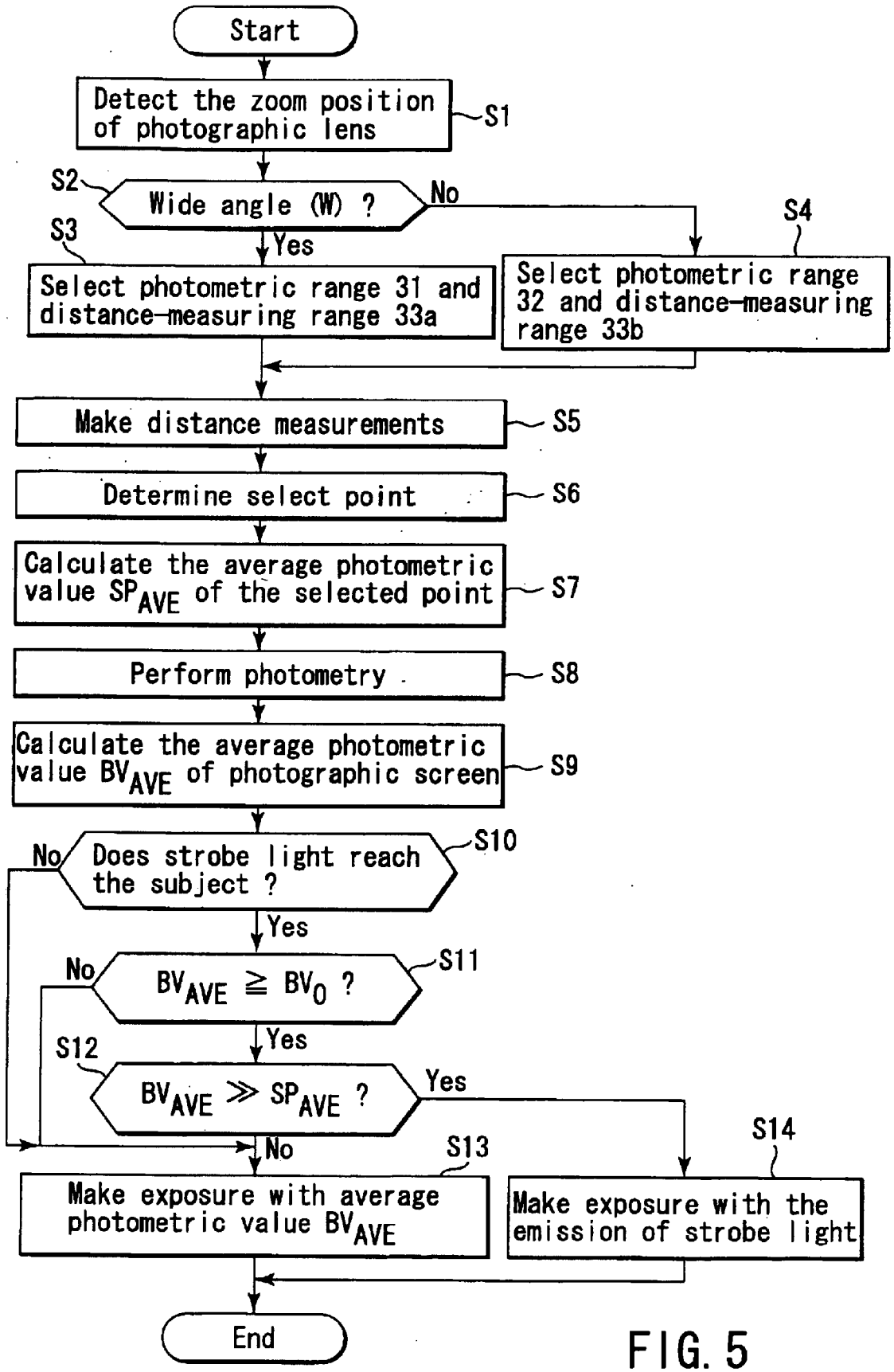
FIG. 5 is a flowchart to help explain exposure control in the first embodiment.

An example of using the photometric sensors and distance-measuring sensors of the first embodiment will be explained by reference to a flowchart in FIG. 5.

First, the zoom position of the photographic lens 18 is determined (step S1). From the determined zoom position, it is determined whether the photographic lens 18 has been turned to the wide angle side (step S2). In this determination, if the lens 18 has been turned to the wide angle side (YES), the angle of view 34W is set as shown in FIG. 3 and the photometric range 31 and distance-measuring range 33a are selected (step S3). On the other hand, if the photographic lens 18 has been turned to the telephoto side, not to the wide angle side (NO), the angle of view 34T is set and the photometric range 32 and distance-measuring range 33b are selected (step S4).

Distance measuring is done in the distance-measuring range selected as described above (step S5). Of the results of the measurements, the point (distance-measuring point) indicating the closest distance where the main subject exists is set as the selected point (step S6). The main subject average photometric value $SP_{AVE}$ indicating the brightness of the image output at the selected point is calculated (step S7). Then, the AE sensor selected in step S4 measures the luminous intensity in the photometric range (photographic screen) (step S8) and calculates the average photometric value $BV_{AVE}$, the average of the outputs obtained in the photometry (step S9).

On the basis of the main subject distance obtained in step S6, the ISO sensitivity of photographing mediums (including the imaging element and film), and information on the zoom position obtained in step S1, the guide number of the strobe unit is calculated and it is determined whether strobe light reaches the main subject (step S10). If it has been determined that the strobe light reaches the main subject (YES), it is determined whether the average photometric value $BV_{AVE}$ is equal to or larger than a specific value $BV_O$ (step S11). That is, the reliability of the obtained main subject average photometric value $SP_{AVE}$ is determined on the basis of the average photometric value. Since the output of the distance-measuring sensor does not pass through the logarithmic compression circuit, the linearity of photometry (dynamic range) is limited. In step S11, it is determined whether the average photometric value $BV_{AVE}$ is equal to or larger than the specific value $BV_O$.

In step S11, if the average photometric value $BV_{AVE}$ is larger than the specific value $BV_O$ (YES), the main subject average photometric value $SP_{AVE}$ is considered reliable. The main subject average photometric value $SP_{AVE}$ is compared with the average photometric value $BV_{AVE}$, thereby determining whether the average photometric value $BV_{AVE}$ is larger than the value $SP_{AVE}$, that is, whether the subject is against light (step S12).

On the other hand, if it has been determined in step S10 that strobe light does not reach the main subject (NO), if it has been determined in step S11 that the average photometric value $BV_{AVE}$ is smaller than the specific value $BV_O$ (NO), or if it has been determined in step S12 that the average photometric value $BV_{AVE}$ is smaller than the main subject average photometric value $SP_{AVE}$ (NO), exposure control is performed on the basis of the average photometric value $BV_{AVE}$, taking no account of the main subject average photometric value $SP_{AVE}$ (step S13). Then, the sequence is completed.

On the other hand, if it has been determined in step S12 that the average photometric value $BV_{AVE}$ is larger than the main subject average photometric value $SP_{AVE}$ (YES), or if it has been determined that the photographic scene is against light with the surroundings brighter than the main subject, or that the photographic scene needs the emission of strobe light, exposure is made with strobe light serving as supplementary light (step S14). Then, the sequence is completed.

As described above, with the first embodiment, the point for bringing the subject into focus on the photographic scene is caused to coincide with the point for exposure adjustment and a decision on backlighting is made by comparing the photometric values (luminances). Thus, the photographer has only to press the release button to make a decision on backlighting and make exposure suitable for the photographic scene. As a result, the photographer can take a picture in focus with a good exposure.

Since whether strobe light reaches the main subject properly is taken into account, it is possible to prevent the battery from being consumed due to a useless emission of strobe light.

Figure 6A:
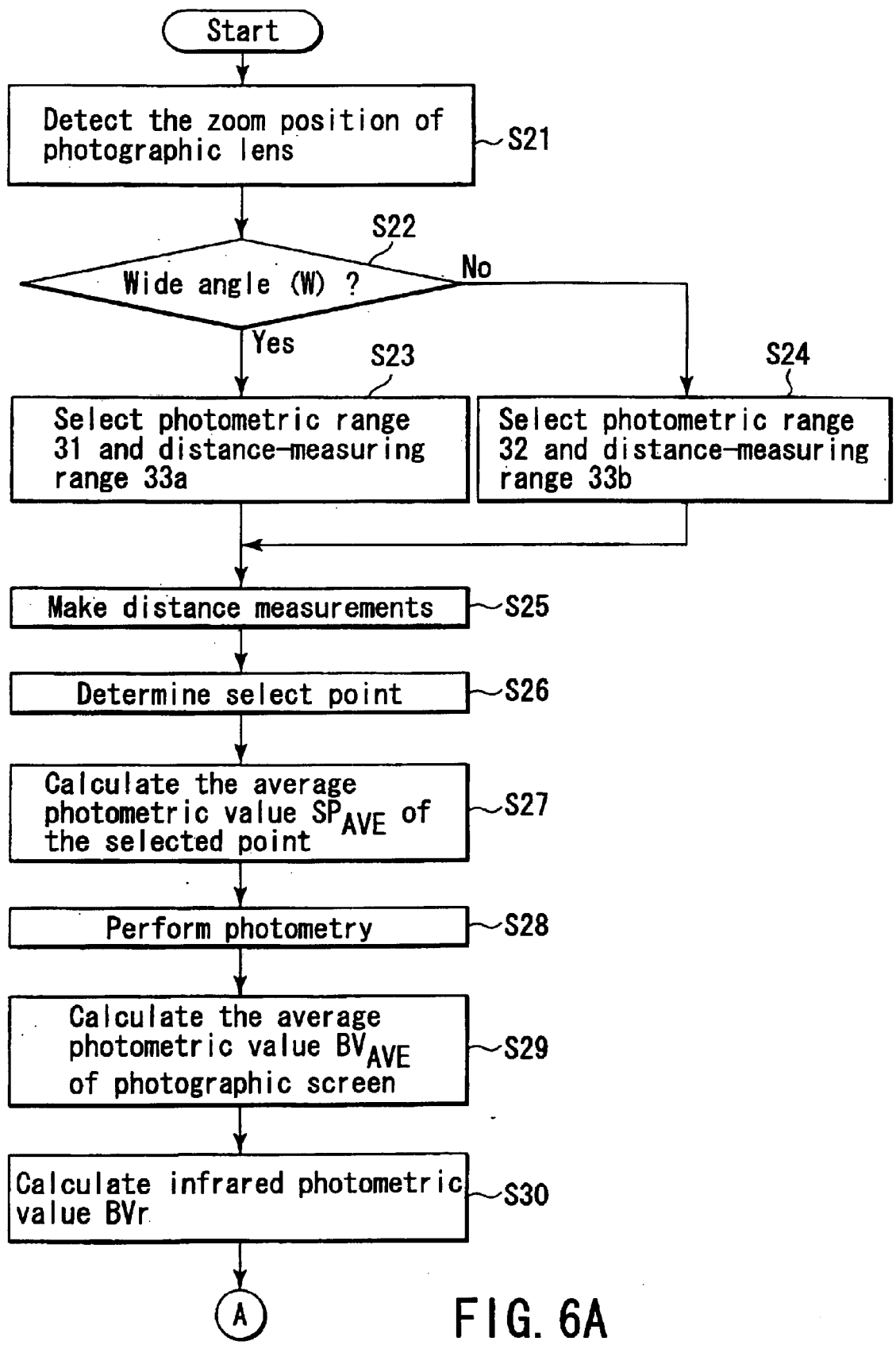
FIGS. 6A and 6B are flowcharts to help explain a first modification of the first embodiment.
Figure 6B:
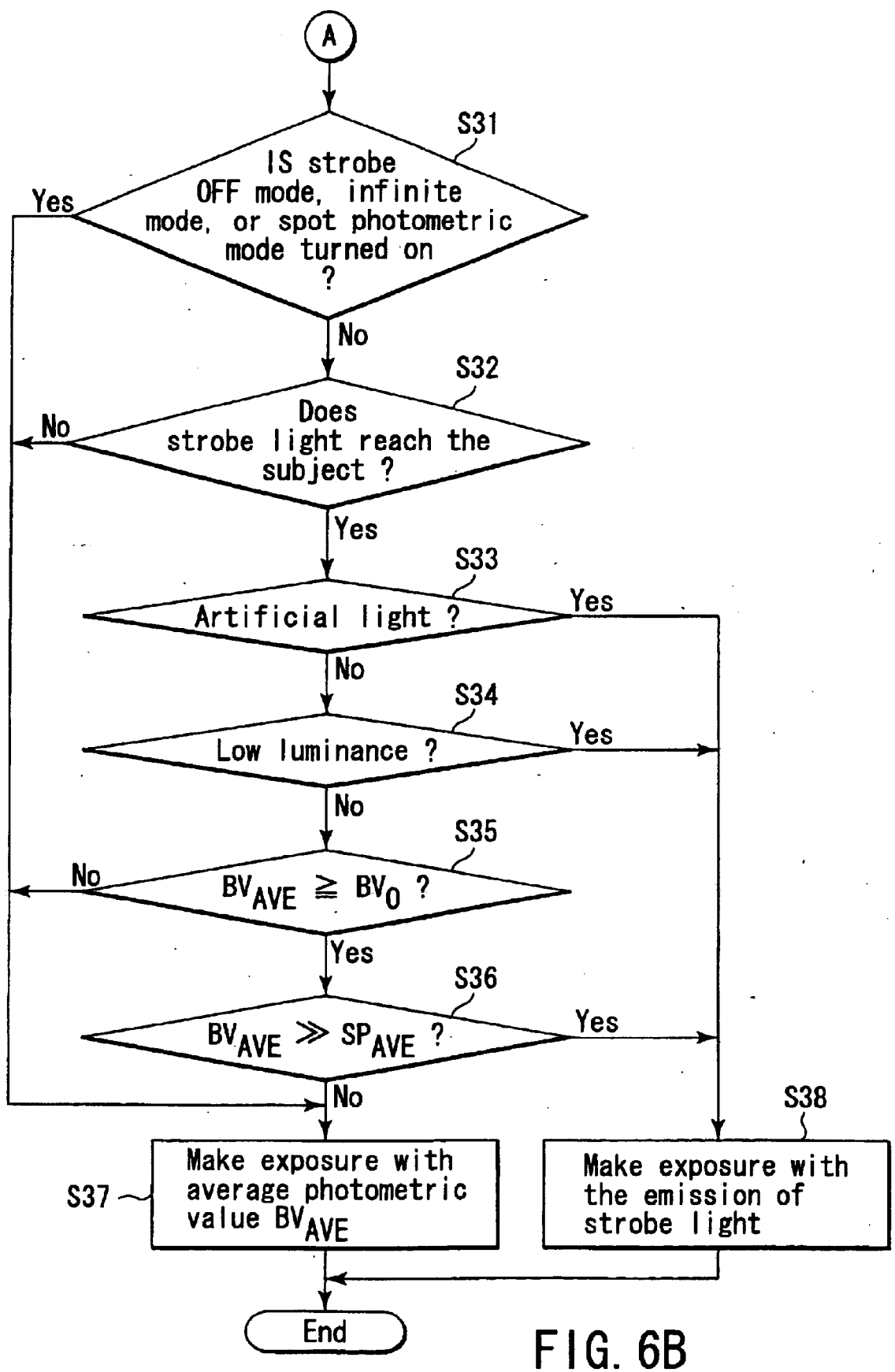

As a first modification of the first embodiment which realizes exposure control putting stress on the main subject, an example of using photometric sensors, distance-measuring sensors, and infrared photometric sensors will be explained by reference to a flowchart shown in FIG. 6. Because step S21 to step S27 in the first modification are the same as step S1 to step S7 in the aforementioned flowchart, they will be explained briefly.

First, the zoom position of the photographic lens 18 is determined. From the zoom position, it is determined whether the photographic lens 18 is on the wide angle side. If the photographic lens 18 has been turned to the wide angle side, the angle of view 34W is set as shown in FIG. 3 and the photometric range 31 and distance-measuring range 33a are selected. On the other hand, if the lens 18 has not been turned to the wide angle side, the angle of view 34T is set and the photometric range 32 and distance-measuring range 33b are selected (step S21 to step S24). Distance measuring is done in these selected distance-measuring ranges. Of the results of the measurements, the point (distance-measuring point) indicating the closest distance where the main subject exists is set as the selected point. The main subject average photometric value $SP_{AVE}$ indicating the brightness of the image output at the selected point is calculated (step S25 to step S27).

Then, the photometric sensor (AE sensor) 1 selected in steps S23, S24 measures the luminous intensity of visible light in the photometric range and the infrared photometric sensor 52 measures the luminous intensity of infrared light (step S28). Then, the average photometric value $BV_{AVE}$, the average of the outputs obtained at the photometric sensor 1, is calculated (step S29). In addition, the infrared photometric value BVr obtained at the infrared photometric sensor 52 is calculated (step S30).

Then, it is determined whether the camera photographic mode set by the mode changing section 55 is the strobe OFF mode to inhibit the emission of strobe light, the infinite mode to photograph the subject in the distance, or the spot photometric mode to measure the luminous intensity only in the central part of the screen (step S31). In this determination, if any one of the modes has been set (YES), control proceeds to step S37 explained later. On the other hand, if none of the modes has been set (NO), the guide number of the strobe unit is calculated on the basis of the main subject distance, the ISO sensitivity of photographing mediums (including the imaging element and film), and information on the zoom position obtained in step S21. Then, it is determined whether strobe light reaches the main subject (step S32).

In step S32, if it has been determined that strobe light does not reach the main subject (NO), control goes to step S37 explained later. On the other hand, if it has been determined in step S32 that strobe light reaches the main subject (YES), it is determined whether artificial light has been detected, on the basis of the average photometric value $BV_{AVE}$ of visible light and the infrared photometric value BVr (step S33).

Figure 8:
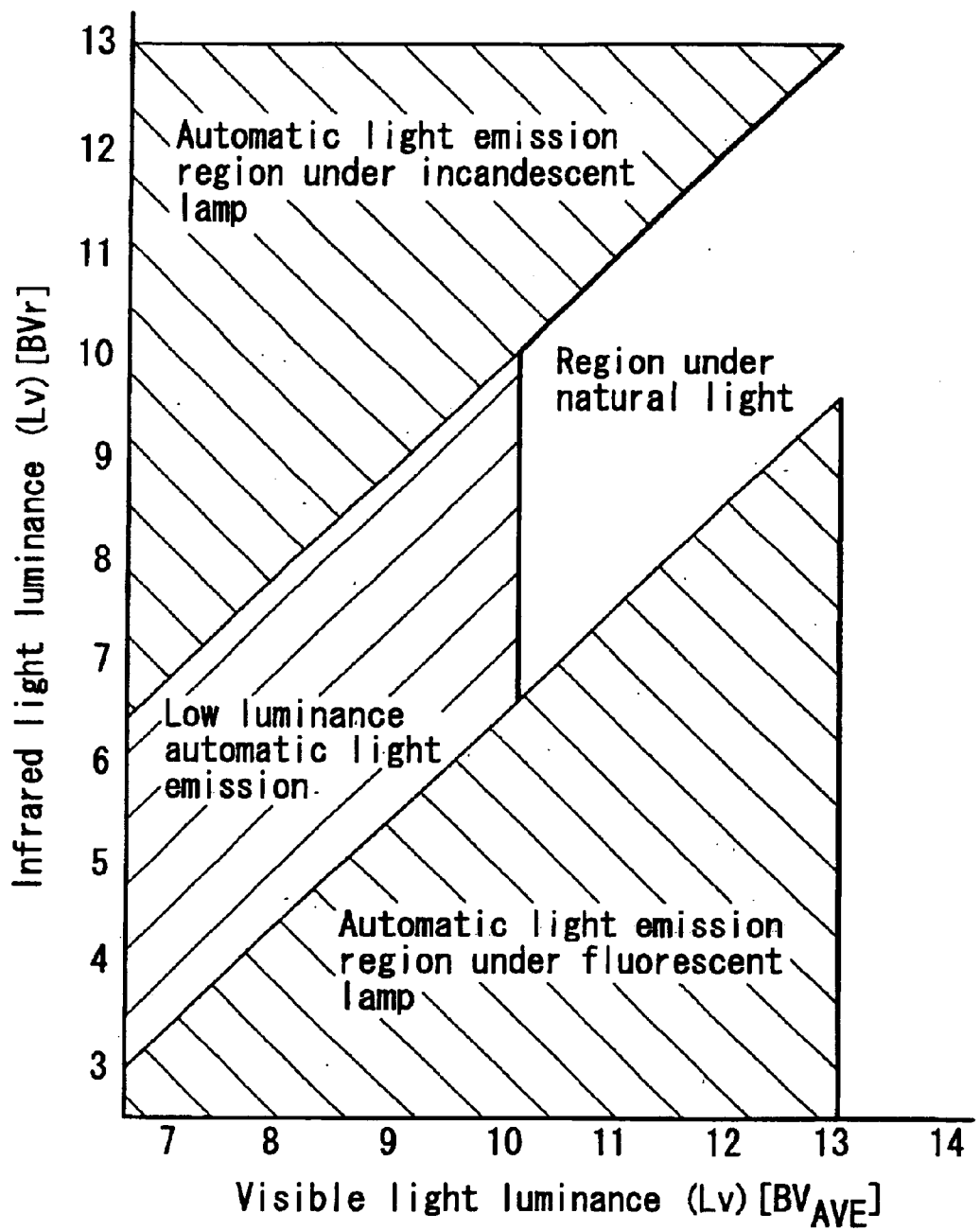
FIG. 8 is a diagram to help explain the relationship between the visible light luminance and the infrared high luminance in the first modification.

As shown in the relationship between the visible light luminance and the infrared light luminance (wide ISO 100) of FIG. 8, if $BV_{AVE}$<visible light luminance Lv13 and $BV_{AVE}$>BVr+3.5 (Lv), it is determined that light is emitted from a fluorescent lamp, whereas if $BV_{AVE}<Lv13$ and $BV_{AVE}<BVr$, it is determined that light is emitted from an incandescent lamp. If such artificial light has been detected (YES), control proceeds to step S38 explained later, where exposure accompanied by the emission of strobe light is made. On the other hand, if artificial light has not been detected (NO), it is determined that there is no color seepage. Then, it is determined whether the subject has a low luminance in visible light (step S34). This determination is made, using $BV_{AVE}<Lv 10$ as a decision criterion as show in FIG. 8. In the determination, if the subject has a low luminance (YES), control goes to step S38. If the subject has not a low luminance (NO), it is determined whether the average photometric value $BV_{AVE}$ is equal to or larger than a specific value $BV_O$ (step S35). A decision on the reliability of the obtained main subject average photometric value $SP_{AVE}$ is made on the basis of the average photometric value. Specifically, since the output of the distance-measuring sensor does not pass through the logarithmic compression circuit, the linearity (dynamic range) of photometry is limited. Thus, in step S35, it is determined whether the average photometric value $BV_{AVE}$ is equal to or larger than the specific value $BV_O$.

In step S35, if it has been determined that the average photometric value $BV_{AVE}$ is larger than the specific value $BV_O$ (YES), the main subject average photometric value $SP_{AVE}$ is considered reliable. The main subject average photometric value $SP_{AVE}$ is compared with the average photometric value $BV_{AVE}$, thereby determining whether the average photometric value $BV_{AVE}$ is larger than the value $SP_{AVE}$, that is, whether the subject is against light (step S36).

If it has been determined in step S31 that the photographic mode is any one of the strobe OFF mode, infinite mode, and spot photometric mode (YES), if it has been determined in step S32 that strobe light does not reach the main subject (NO), if it has been determined in step S35 that the average photometric value $BV_{AVE}$ is smaller than the specific value $BV_O$ (NO), or if it has been determined in step S36 that the average photometric value $BV_{AVE}$ is smaller than the main subject average photometric value $SP_{AVE}$ (NO), exposure control is performed on the basis of the average photometric value $BV_{AVE}$, taking no account of the main subject average photometric value $SP_{AVE}$ (step S37). Then, the sequence is completed.

On the other hand, if it has been determined in step S33 that artificial light has been detected (YES), it has been determined in step S34 that the main subject has a low luminance (YES), or if it has been determined in step S36 that the average photometric value $BV_{AVE}$ is larger than the main subject average photometric value $SP_{AVE}$ (YES), that is, it has been determined that the photographic scene is against light with the surroundings brighter than the main subject, or that the photographic scene needs the emission of strobe light, exposure is made with strobe light serving as supplementary light (step S38). Then, the sequence is completed.

As described above, the first modification not only produces the same effect of the first embodiment but also prevents the occurrence of color seepage because of the emission of strobe light taking color seepage into account on the basis of a decision on artificial light. This makes it easier to take a picture of a natural shade in proper focus with adjusted exposure.

Figure 7A:
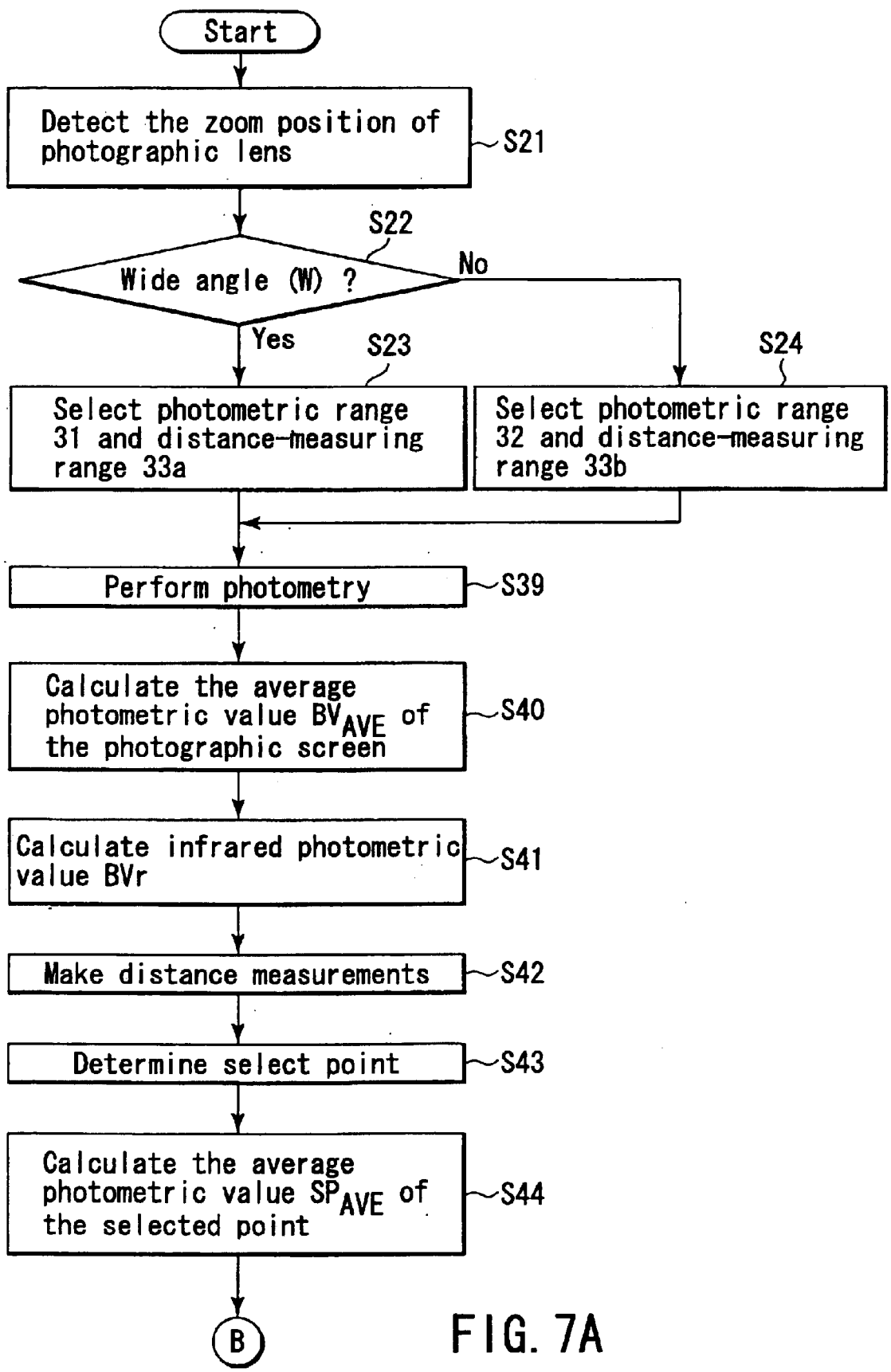
FIGS. 7A and 7B are flowcharts to help explain a second modification of-the first embodiment.
Figure 7B:
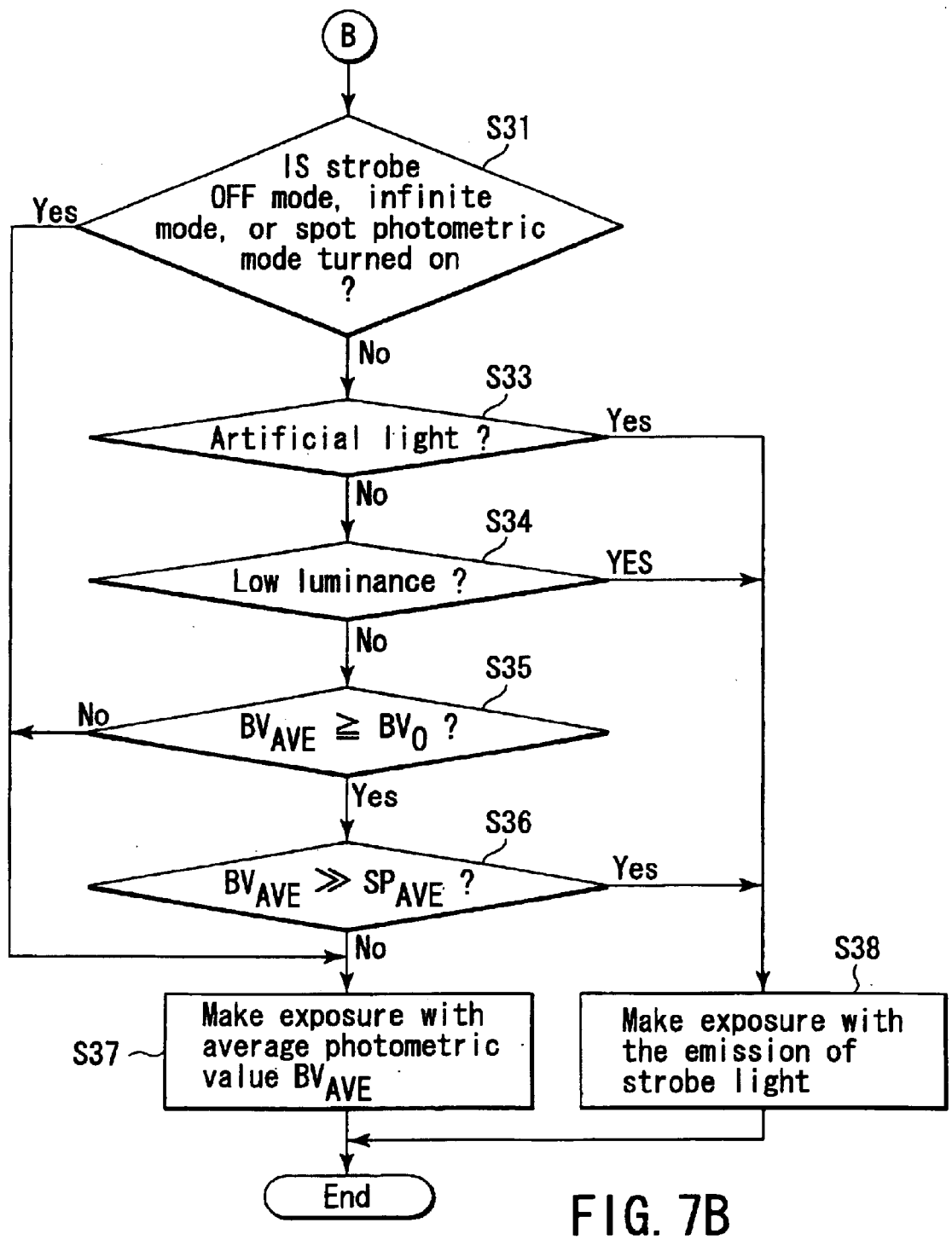

Furthermore, a second modification of the first embodiment will be explained by reference to a flowchart shown in FIG. 7. The second modification is such that the sequence of the distance-measuring step and the photometric step in the first modification is reversed and the step of determining whether strobe light reaches the subject is omitted. In the second modification, the same steps as those in the first modification are indicated by the same reference numerals and will be explained briefly. Step S39 to step S41 in the second modification correspond to step S28 to step S30 in the first modification. Step S42 to step S44 in the second modification correspond to step S25 to step S27 in the first modification.

First, the zoom position of the photographic lens 18 is determined. From the zoom position, it is determined whether the photographic lens 18 is on the wide angle side. If the photographic lens 18 has been turned to the wide angle side, the angle of view 34W is set as shown in FIG. 3 and the photometric range 31 and distance-measuring range 33a are selected. On the other hand, if the lens 18 has not been turned to the wide angle side, the angle of view 34T is set and the photometric range 32 and distance-measuring range 33b are selected (step S21 to step S24).

Then, the photometric sensor (AE sensor) 1 selected in steps S23, S24 measures the luminous intensity of visible light in the photometric range and the infrared photometric sensor 52 measures the luminous intensity of infrared light. Then, the average photometric value $BV_{AVE}$, the average of the outputs obtained at the photometric sensor 1, is calculated. In addition, the infrared photometric value BVr obtained at the infrared photometric sensor 52 is calculated (step S39 to step S41).

Then, distance measuring is done in the selected distance-measuring range 33a or 33b. Of the results of the measurements, the point (distance-measuring point) indicating the closest distance where the main subject exists is set as the selected point. The main subject average photometric value $SP_{AVE}$ indicating the brightness of the image output at the selected point is calculated (step S42 to step S44).

If it has been determined in step S31 that any one of the strobe OFF mode, infinite mode, and spot photometry mode has been set (YES), if it has been determined in step S32 that strobe light does not reach the main subject (NO), if it has been determined in step S35 that the average photometric value $BV_{AVE}$ is smaller than the specific value $BV_O$ (NO), or if it has been determined in step S36 that the average photometric value $BV_{AVE}$ is smaller than the main subject average photometric value $SP_{AVE}$ (NO), meaning that the subject is not against light, exposure control is performed on the basis of the average photometric value $BV_{AVE}$, taking no account of the main subject average photometric value $SP_{AVE}$ (step S37). Then, the sequence is completed.

On the other hand, if it has been determined in step S33 that artificial light has been detected (YES), it has been determined in step S34 that the main subject has a low luminance (YES), or if it has been determined in step S36 that the average photometric value $BV_{AVE}$ is larger than the main subject average photometric value $SP_{AVE}$ (YES), that is, it has been determined that the photographic scene is against light with the surroundings brighter than the main subject, or that the photographic scene needs the emission of strobe light, exposure is made with strobe light serving as supplementary light (step S38). Then, the sequence is completed.

In the second modification, the distance can be measured, taking into account the results of measurements by the photometric sensors. Therefore, it is possible to take a picture in accurate focus with proper exposure without being influenced by the luminance.

A second embodiment of the present invention will be explained.

Figure 9:
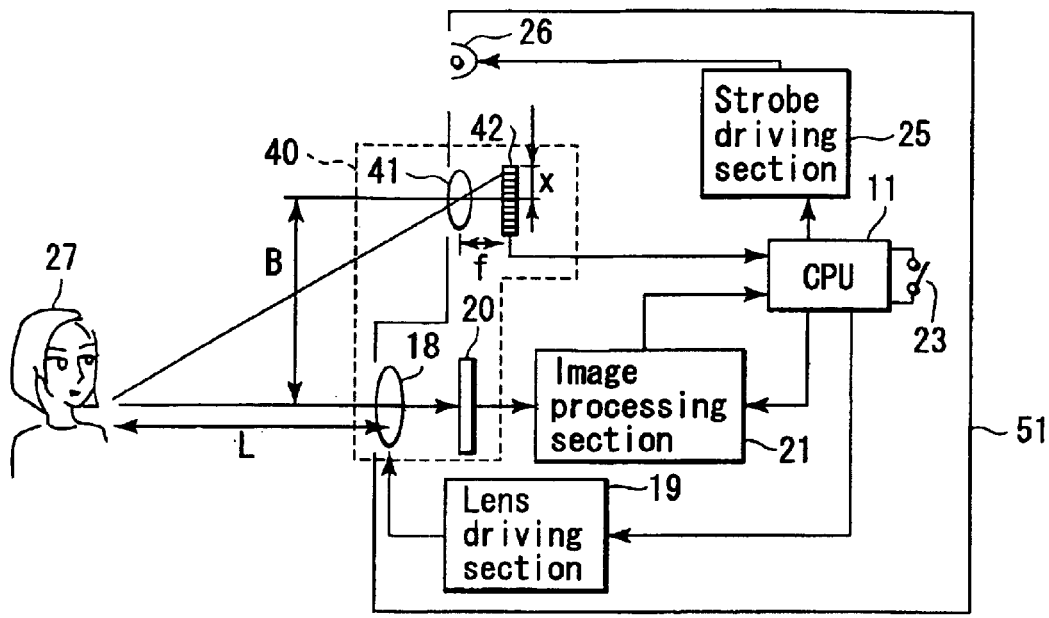
FIG. 9 shows a concrete configuration provided on the camera of the second embodiment.

FIG. 9 shows a conceptual configuration of a camera related to the second embodiment. In the second embodiment, the like component parts as those of FIG. 2 are indicated by the same reference numerals and explanation of them will be omitted. While the distance-measuring section 25 of the first embodiment requires a pair of light-receiving lenses 12a, 12b and a pair of sensor arrays 13a, 13c, a distance-measuring section 40 of the second embodiment uses a light-receiving lens 41, a sensor array (external array sensor) 42, a photographic lens 18, and an imaging element 20 to make trigonometric distance measurements.

Figure 10A:
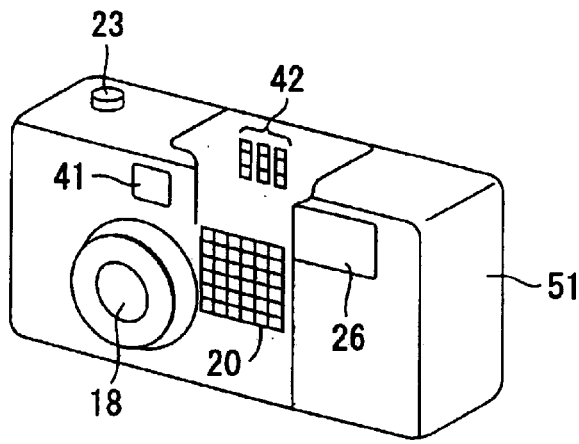
FIGS. 10A, 10B, 10C, and 10D show an outward appearance and a part of the inside of the camera in the second embodiment.
Figure 10B:
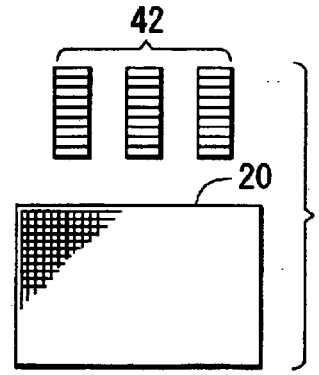

Trigonometric distance measurements are made as follows. The photographic lens 18 is set in a specific position. It is determined in which part of the sensor array 42 the same image as the image data obtained in the central part of the screen of the CCD 20 can be detected. From the result of the determination, the subject distance L is found on the principle of trigonometric distance measurements. Of course, use of the image data in the part deviating from the central part of the screen enables the distance of the main subject not existing in the middle of the screen to be measured as shown in FIG. 3. In this case, the sensor array 42 is composed of a plurality of columns of sensor arrays as shown in FIG. 10B. FIG. 10A shows an outward appearance of and a part of the inside of a camera 51 provided with the distance-measuring section of the second embodiment.

In the camera 51, the photographic lens 18 is provided almost in the center of the camera front. Above the photographic lens 18, the light-receiving lens 41 and strobe emitting section 26 are provided side by side. On the top of the camera, the release switch 23 is provided. Inside the camera, the imaging element 20 is provided behind the photographic lens 18 and the sensor array 42 is provided behind the light-receiving lens 41.

Figure 10C:
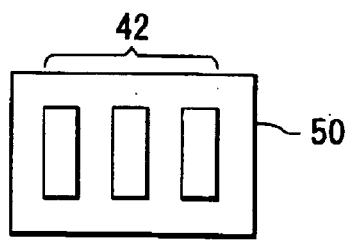
Figure 10D:
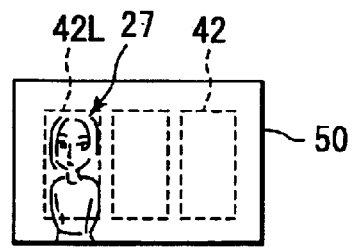

The sensor array 42 is composed of, for example, three line sensors arranged side by side as shown in FIG. 10B to measure the distance of the main subject shifted laterally from the center of the photographic screen. A lateral arrangement of sensor arrays 42 with respect to the photographic screen 50 as shown in FIG. 10C makes it possible to monitor the main subject moved sideways (42L) or standing aside as shown in FIG. 10D.

Accordingly, with the second embodiment, a space corresponding to one light-receiving lens and the cost of one sensor array can be saved. The light-receiving lens and the photographic lens can be provided with a wider space between them, with the result that the base length B becomes longer and therefore higher accuracy can be realized.

Figure 11:
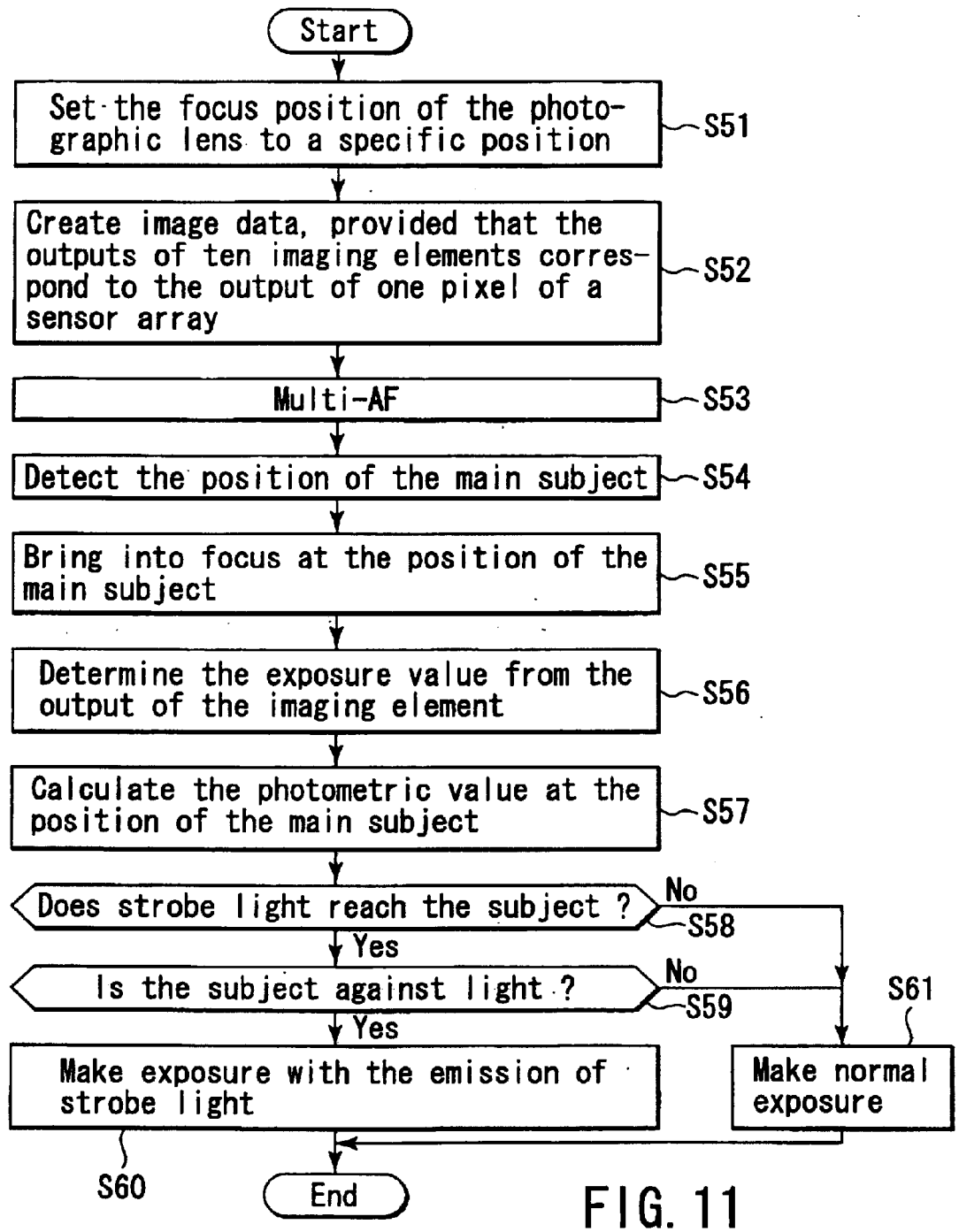
FIG. 11 is a flowchart to help explain exposure control in the second embodiment.
Figure 12:
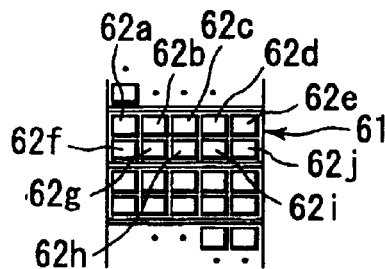
FIG. 12 is a diagram to help explain the relationship between the pixel area of the imaging element and the distance-measuring area (point) of the AF sensor.

Referring to a flowchart shown in FIG. 11, exposure control in the camera of the second embodiment will be explained.

First, information on the zoom position of the photographic lens 18 is determined. On the basis of the information about the zoom position, the focus position of the photographic lens 18 is set to a specific position (step S51). The position setting makes the relationship between the photographic lens 18 and the imaging element 20 almost equal to the relationship between the light-receiving lens 41 and the sensor array 42. This is done to increase the distance-measuring accuracy by making the focus position of the photographic lens 18 almost equal to that of the light-receiving lens 41. In the setting, one pixel of the sensor array 42 does not correspond to one pixel of the imaging element 20 in a one-to-one ratio. To overcome this problem, all of the outputs of ten pixels, 2×5, of the imaging element 20 are added and caused to correspond to one pixel of distance-measuring image data (step S52). The addition matches the distance-measuring range (output) of the sensor array 42 with that of the imaging element 20.

Next, multi-AF is performed by trigonometric distance measurements (step S53). From the obtained distance-measuring data, the position of the main subject is detected (the point is selected) (step S54). Then, focusing is done so as to meet the position of the main subject or the distance to the selected point (step S55). During the focusing, the output of the imaging element 20 is monitored and a fine adjustment of the position of the photographic lens 18 is made so that the contrast of the image formed on the light-receiving surface of the imaging element 20 may be optimum.

Next, the exposure value is determined from the output of all of the imaging element 20 (step S56). Next, using the AF sensor, the distance-measuring value of only the position of the main subject is calculated (step S57). For example, in a photographic scene as shown in FIG. 10D, the average value of the output of the sensor array 42L monitoring the existence of the main subject is found as the distance-measuring value.

Next, on the basis of the main subject distance obtained in step S54, the ISO sensitivity of photographing mediums (including the imaging element and film), and information on the zoom position obtained in step S51, the guide number of the strobe unit is calculated. Then, it is determined whether strobe light reaches the main subject (step S58).

If it has been determined that strobe light reaches the main subject (YES), the average photometric value of the entire screen by the imaging element 20 is compared with the photometric value by the sensor array 42 of the area where the main subject can possibly exist, thereby determining whether the subject is against light (step S59). If the average photometric value of the entire screen is larger than the photometric value of the main subject (YES), it is determined that the photographic scene is against light. Then, exposure accompanied by the emission of strobe light is made (step S60), which completes the sequence.

If it has been determined in step S58 that the strobe light does not reach the main subject (NO), or if it has been determined in step S59 that the photometric value of the main subject is larger than the average photometric value of the entire screen (NO), normal exposure is made on the basis of the photometric value of the main subject (step S61), which completes the sequence.

Consequently, with the second embodiment, a space corresponding to one light-receiving lens and the cost of one sensor array (external light AF sensor) can be saved. The light-receiving lens and the photographic lens can be provided with a wider space between them, with the result that the base length B becomes longer and therefore higher accuracy can be realized. In photometry by the AF sensor, one sensor 61 can represent ten pixels of data of the imaging elements 62a to 62j, which enables the average value to be calculated easily at a high speed. Since consideration is given to whether strobe light reaches the main subject properly, it is possible to prevent the battery from being consumed due to a useless emission of strobe light.

Next, a third embodiment of the present invention will be explained.

Figure 13A:
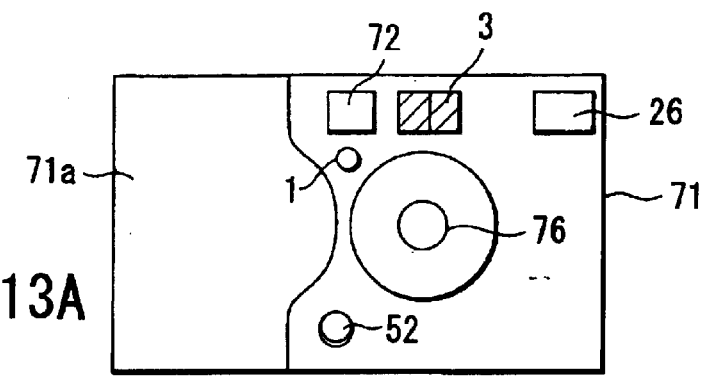
FIGS. 13A and 13B show concrete configurations provided on the camera of the third embodiment.
Figure 13B:
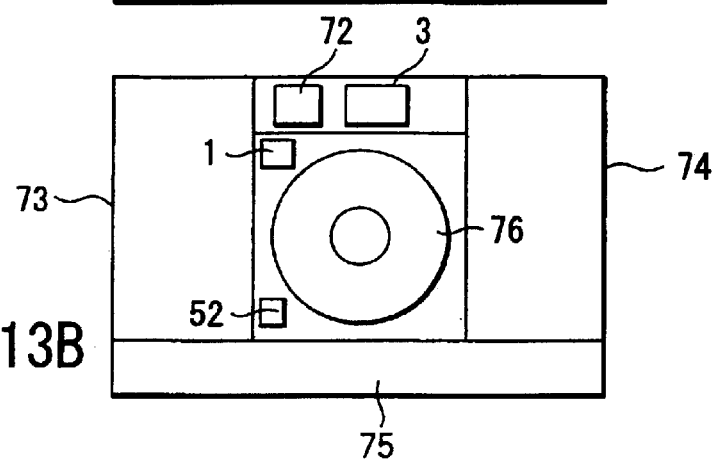

FIG. 13A shows an outward appearance of the camera viewed from the front. FIG. 13B shows an internal configuration with the exterior of the camera removed.

In the first and second modifications, the photometric sensors, distance-measuring sensors, and infrared photometric sensors have been used. When they are mounted on the camera, various limits are set to their locations, because the camera is required to be more compact and lighter. That is, the individual component parts have to be mounted collectively so as not to allow a useless space, while assuring the performance of the camera.

The camera 71 is in the photographing standby state, with the front cover 71 opened and the lens barrel 76 of the photographic lens protruded. Above the lens barrel 76, the finder 72 and the distance-measuring sensor 3 are provided side by side. At the top right of the front, the strobe emitting section 26 is provided. The photometric sensor 1 is provided below the finder 72 and in the vicinity of the lens barrel 76 and distance-measuring sensor 3.

On both sides between which the lens barrel 76 is sandwiched, a Patrone compartment 73 for loading a detachable film cartridge (not shown) and a spool compartment 74 provided with a spool (not shown) for winding the film. On the underside of the camera body, there is provided a winder 75 that is coupled with the film cartridge and spool and feeds the film. The film feeding includes winding and rewinding the film.

Below the finder 72 and in the place enclosed by the lens barrel 76 and Patrone compartment 73, the remote control sensor, or the infrared photometric sensor 52, is provided.

The photometric sensor 1 and infrared photometric sensor 52 are provided in the space left after the primary component parts, including the lens barrel 76, Patrone-compartment 73, and winder 75, are incorporated, which eliminates a useless space and therefore contributes to the miniaturization of the camera. The present invention is not limited to the arrangement of the photometric sensors and distance-measuring sensors. They have only to be provided in the vicinity of the finder. This arrangement helps reduce the parallax with respect to the finder during photometry and distance measurement.

The less the parallax of each of the photometric sensor 1, distance-measuring sensor 3, and infrared photometric sensor 52 with respect to the finder is, the more accurately the distance measurement and photometry of the subject desired by the user are performed. Although it is desirable that the photometric sensor 1, distance-measuring sensor 3, and infrared photometric sensor 52 should be provided as close to the finder as possible, it is difficult to provide a plurality of component elements in a specific place of the camera from the viewpoint of the miniaturization of the camera. Since the infrared photometric sensor 52 has only to detect the infrared light luminance of the whole subject field, there is no problem even when the parallax of the infrared photometric sensor 52 with respect to the finder is greater than that of the photometric sensor 1 or distance-measuring sensor 3. Therefore, in the third embodiment, the infrared photometric sensor 42 is provided farther away from the finder than the photometric sensor 1 and distance-measuring sensor 3, thereby realizing not only accurate photometry and distance measurement but also the miniaturization of the camera.

As described above, with the first to third embodiments, even in a photographic scene where a decision on backlighting was difficult to make in the prior art, proper exposure is made with a simple operation by comparing the photometric value of the area where the main subject exists with the photometric value of the entire photographic screen, making a decision on the backlighting state correctly to determine whether to emit strobe light, and making a decision on artificial light to determine whether to emit strobe light. Therefore, it is possible to provide an camera enabling the user to enjoy photography.

With the exposure control system of the embodiments of the present invention, it is possible to provide a camera capable of making a decision on backlighting by comparing the luminance of the area where the main subject exists in the photographic screen with the average luminance of the photographic screen and photographing the main subject with proper exposure without being influenced by the composition of the photographic scene. Furthermore, the camera, which is provided with the artificial light judgment section, compares visible light with infrared light. When light illuminating the subject is artificial, for example, fluorescent lamp light, the camera can photograph the subject with proper exposure so as to prevent color seepage, such as the greening of the image.

Next, a fourth to a seventh embodiments of a camera with a exposure control function according to the present invention will be explained.

Figure 14:
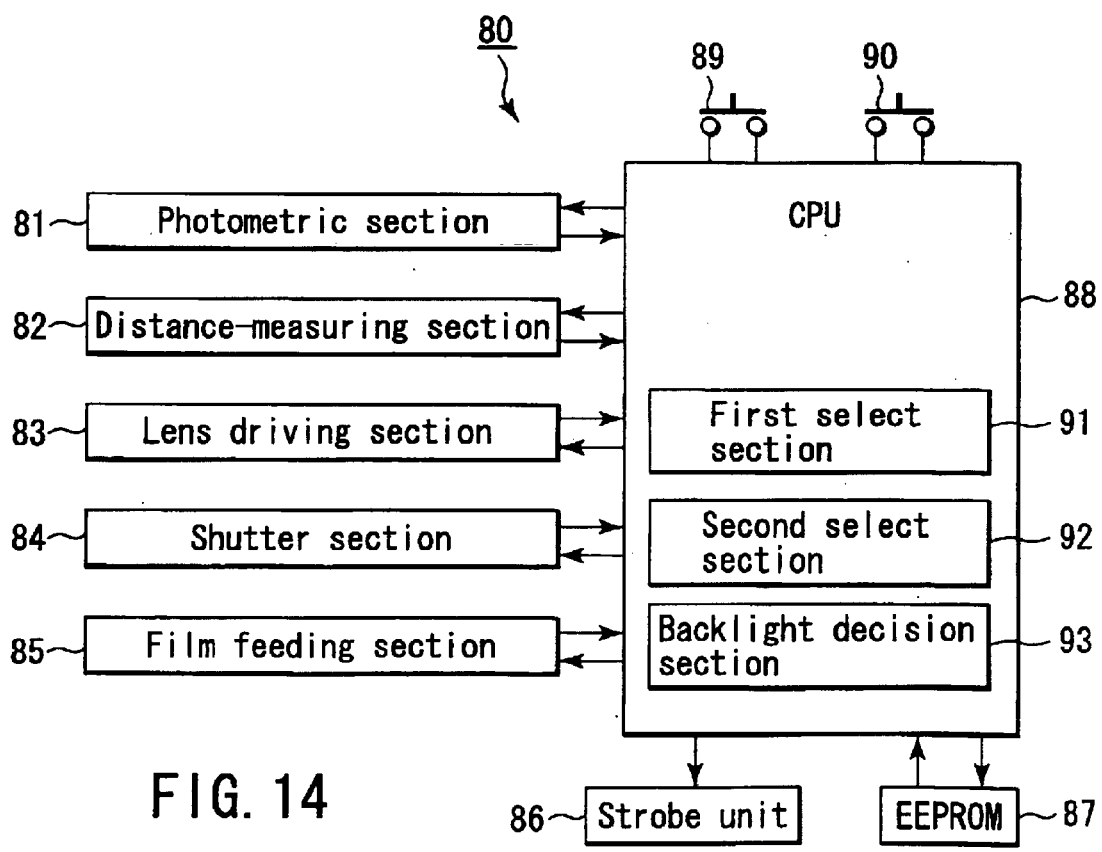
FIG. 14 is a block diagram of the main part of a camera with a photometric function according to a fourth to a seventh embodiment of the present invention.

FIG. 14 shows an example of the basic configuration of a camera with a photometric function according to the fourth embodiment of the present invention. The basic configuration is assumed to be equivalent to the basic configuration of cameras related to not only the fourth embodiment but also the fifth to seventh embodiments explained later.

A camera 80 includes a photometric section 81 for measuring information on the luminance of the subject in the photographic scene and a distance-measuring section 82 for measuring information on the subject distance on the same photographic scene. The camera 80 further includes a lens driving section 83 for driving a focusing lens on the basis of the obtained distance-measuring information, a shutter section 84 for exposing the film, a film feeding section 85 for winding and rewinding the film, and a strobe unit 86 for emitting light and illuminating the subject when the subject is low in luminance or against light.

The camera 80 further includes a nonvolatile memory, such as EEPROM 87, for storing various setting values and adjusting values for the camera 80 and a CPU 88 for controlling the operation sequence of the whole camera 80 and doing calculations.

The camera 80 further includes a 2-stage release switch composed of a first release switch (hereinafter, abbreviated as "1RSW") 89 and a second release switch (hereinafter, abbreviated as "2RSW") 90. 1RSW89 is used for the photographer to inform the camera of the measuring of information on the subject necessary for photography, such as distance measurements or photometry and the execution of calculations. 2RSW90 is used to inform the camera of the execution of photography on the basis of the measured and calculated subject information, after 1RSW89 has been turned on.

The CPU 88 performs control of all of the camera according to a release sequence program (often called a camera sequence program) serving as a virtual control program. In the control program, the following sections are constructed in software: for example, they are a first select section 91 for selecting the distance-measuring area whose distance-measuring data indicates the closest distance from a plurality of distance-measuring areas on the photographic screen, a second select section 92 for selecting the photometric area corresponding to the distance-measuring area whose distance-measuring data indicates the closest distance selected by the first select section and the photometric area whose photometric data indicates the lowest luminance from its adjacent photometric areas, and a backlight judgment section 93 for making a decision on backlighting on the basis of the difference between the photometric data about the photometric area with the lowest luminance selected by the second select section and the average photometric data on the photographic screen.

Figure 15:
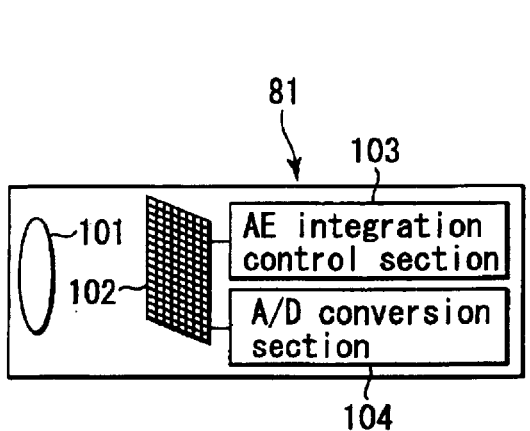
FIG. 15 schematically shows a configuration of the photometric section related to the fourth to sixth embodiments.
Figure 16:
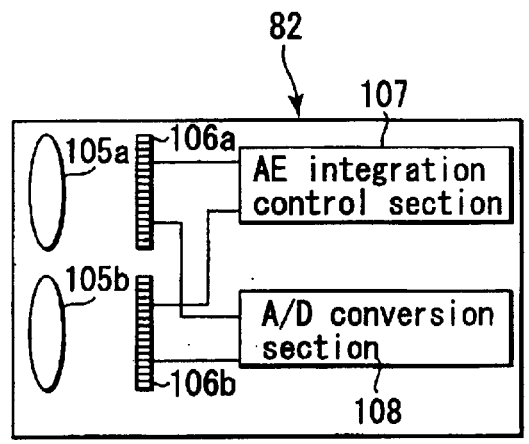
FIG. 16 schematically shows a configuration of the distance-measuring section related to the fourth to sixth embodiments.

The distance-measuring section 81 and photometric section 82 mounted on the camera 80 are configured as shown in FIGS. 15 and 16.

FIG. 15 schematically shows an example of the configuration of the photometric section 81 related to the fourth to sixth embodiments. The photometric section 81 includes a photometric lens 101 for gathering light components at the photographic screen for photometric measurements, a multidivisional photometric sensor 102 for dividing the gathered light components into a plurality of regions and receiving them, a photometric integration control section 103 for controlling the integrating operation of the multidivisional photometric sensor 102, and an A/D conversion section 104 for converting the integration output of the multidivisional photometric sensor 102 from the analog signal into a digital signal, with the A/D conversion section 104 connected to the multidivisional photometric sensor 102. With this configuration, the digital signal produced by a known photometric method to calculate the brightness of the subject is supplied to the CPU 88.

FIG. 16 schematically shows the configuration of the distance-measuring section 82 related to the fourth to sixth embodiments. The distance-measuring section 82 includes a pair of light-receiving lenses 105a, 105b for forming the image of the subject for distance measurement, a pair of line sensors 106a, 106b for photoelectrically converting the subject image formed by the light-receiving lenses 105a, 105b according to their light intensity to produce an electric signal (subject image signal), a distance-measuring (AF) integration control section 107 for controlling the integrating operation of the line sensors 106a, 106b, and an A/D conversion section 108 for reading the subject image signal from the line sensors 106a, 106b and converting the analog signal into a digital signal. With this configuration, the digital signal which is produced by a known distance-measuring method and used for calculating the distance to the subject is supplied to the CPU 88.

To help understand the characteristics of the fourth embodiment, the subject image in distance measurement and photometry and the area where the image can be detected will be explained.

Figure 17:
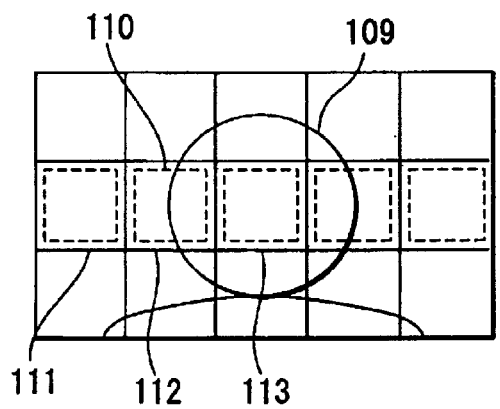
FIG. 17 shows the relationship between the photometric area and the distance-measuring area in the fourth embodiment.

FIG. 17 schematically shows the relationship between the photometric area and the distance-measuring area in the fourth embodiment. In the areas for photometry and distance measurement, an image of a person 109, the main subject to be photographed, is emitted as shown in the figure. The areas for photometry and distance measurement are divided in a matrix on the finder screen (or image forming screen), which forms the following types of areas.

In the fourth embodiment, the photometric section 81 measures the luminous intensity in each of the photometric areas divided into a large number of rectangles as shown by solid lines in FIG. 17. The distance-measuring section 82 measures the distance to each of the rectangular distance-measuring areas arranged in the middle in the longitudinal direction as shown by broken lines.

From the distance-measuring areas, the one whose measured distance is the closest is selected. The photometric area corresponding to the selected distance-measuring area is selected. Thereafter, from the selected photometric area and the adjacent photometric areas on both sides, the one whose photometric result is the lowest luminance is selected.

For example, when the distance-measuring area 110 presents distance-measuring data about the closest distance, an adjacent photometric area 111 and an adjacent photometric area 113 are present on both sides of the photometric area 112 corresponding to the distance-measuring area 110.

Here, an algorithm related to the processes up to a decision on backlighting will be explained.

For example, when the distance-measuring data about the distance-measuring area 110 in FIG. 17 indicates the closest distance, the photometric area 112 is selected. It is assumed that the photometric data items about the photometric area 112 and its adjacent photometric areas 111, 113 are $B_{VAE}$ 112, $B_{VAE}$ 111, and $B_{VAE}$ 113, respectively, and their relationship in luminance level meets the expression $B_{VAE}$ 113<$B_{VAE}$ 112<$B_{VAE}$ 111. In this case, the photometric data $B_{VAE}$ 113 about the photometric area 113 whose photometric data indicates the lowest luminance is selected.

Next, the average photometric data $B_{VAE}$AVE of the individual photometric areas is determined. When the difference between the average photometric data $B_{VAE}$AVE and the photometric data $B_{VAE}$ 113 selected as described above is larger than a backlight decision value GBvTH as a threshold value, it is determined that the subject is against light.

Specifically, with backlight decision value GBVTH=2 EV, if the following expression is met:

$$B_{VAE}AVE - B_{VAE} 113 > 2 \quad (1)$$

it is determined that the photographic scene is against light.

If it is determined that the photographic scene is against light, the photometric data $B_{VAE}$ 113 about the photometric area 113 is set as photometric data used in exposure calculations. On the other hand, if it is determined that the photographic scene is not against light, the average photometric data $B_{VAE}$AVE about the photographic screen is set as photometric data used in exposure calculations.

The reason why the photometric data about the lowest luminance is selected from the photometric area corresponding to the closest distance-measuring area and its adjacent photometric areas is that, when the closest distance-measuring area 110 includes both of the image of a person 109, the main subject, and the background in the visual field as shown in FIG. 17, the photometric data $B_{VAE}$ 112 about the photometric area 112 corresponding to the distance-measuring area 110 has the average of the luminance of the image of a person 109 against light with the high luminance background, with the result that it can possibly be determined that the photographic scene is not-against light, even if the scene is actually against light.

As a modification of the fourth embodiment, the largest photometric data in a plurality of photometric areas on the photographic screen may be used in place of the average photometric data $B_{VAE}$AVE on the photographic screen, when a decision on backlighting is made. This prevents the photographic scene from being determined erroneously to be not against light in a case where the low luminance part occupies a large proportion of the background of the main subject and the main subject itself is against light. Thus, it is possible to prevent the exposure of the main subject from being improper due to the misjudgment.

Furthermore, when a decision on backlighting is made, exposure control may be performed with the emission of light from the strobe unit, instead of exposure control based on the lowest photometric data. In this exposure control, the main subject is exposed properly with strobe light and the background is exposed properly for the exposure time.

While the line sensors have been used in the distance-measuring section 82, an area sensor may be used to make two-dimensional distance measurements. Use of the area sensor enables a decision on backlighting to be made in a much wider area on the photographic screen.

Figure 19:
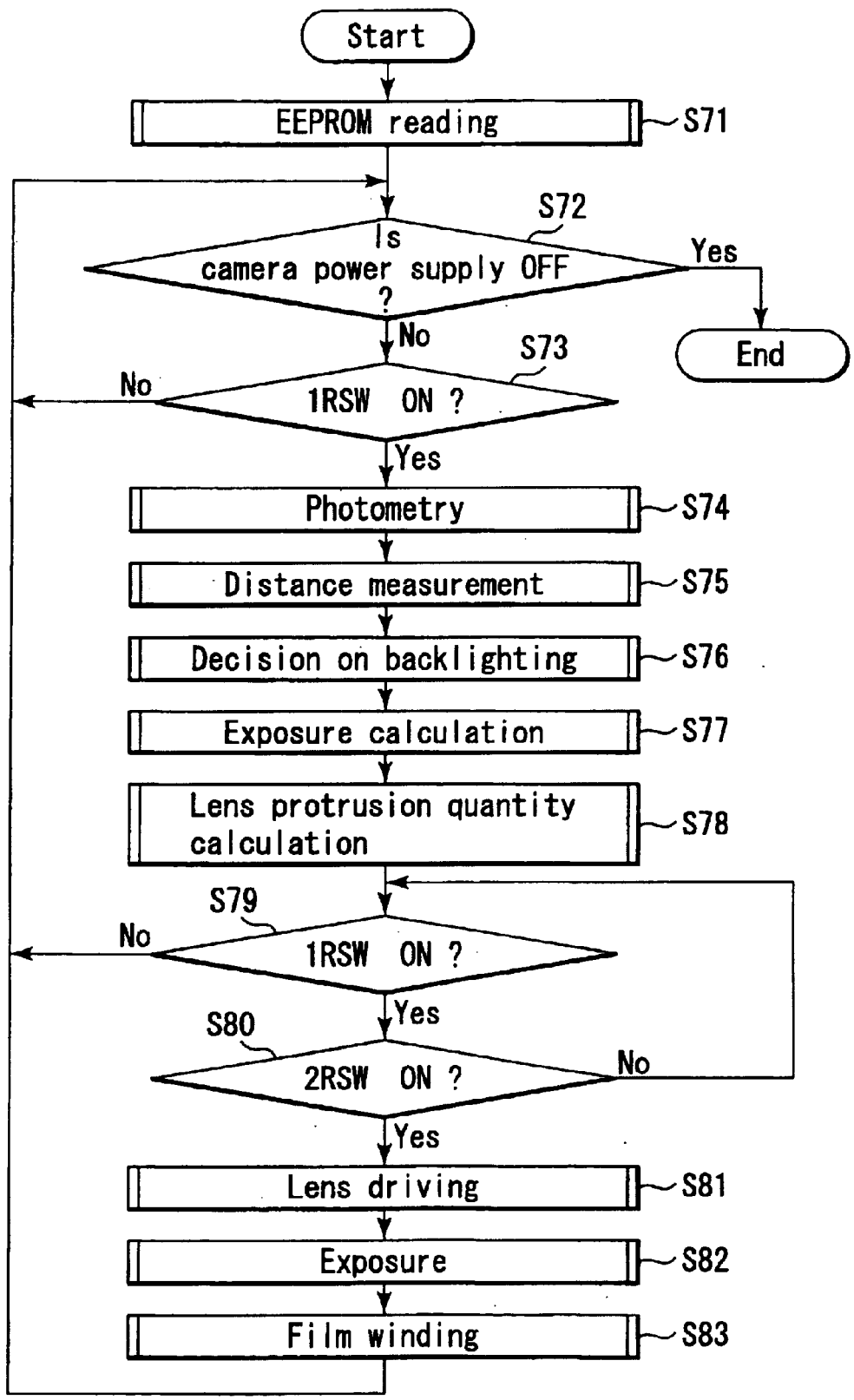
FIG. 19 is a flowchart to help explain the release sequence of a camera provided with the photometric device related to the fourth to sixth embodiments.

Next, the operation and control of the camera related to the fourth embodiment will be explained in detail. FIG. 19 shows a flowchart for the release sequence of the camera provided with the photometric unit related to the fourth embodiment of the present invention. This flowchart serves as the main routine common to the fifth to seventh embodiments explained later.

First, when the power switch (not shown) of the camera is turned on, previously stored data, including various setting values and adjusting values, are read from the EEPROM 87 and expanded into a RAM (not shown) in the CPU 88. Then, initial setting is done (step S71).

Next, it is determined whether the power switch is in the OFF state (step S72). If the power switch is in the ON state (NO), it is determined whether 1RSW 89 is turned on (step S73). On the other hand, if the power switch is in the OFF state (YES), the sequence is completed.

If it has been determined in step S73 that 1RSW89 is in the ON state (YES), a specific photometry is performed and photometric data about each of the photometric areas on the photographic screen is calculated (step S74). On the other hand, if 1RSW89 is in the OFF state (NO), control returns to step S72 and is standing by.

Next, a specific distance measurement is made and distance-measuring data about each of the distance-measuring areas on the photographic screen is calculated (step S75). Thereafter, on the basis of the result of the photometry obtained in step S74 and the result of the distance measurement in step S75, a decision on backlighting explained later is made (step S76).

On the basis of the exposure computing data set in the decision on backlighting in step S76, exposure calculations are done, thereby determining exposure control data (step S77). On the basis of the calculated subject distance data, the amount of protrusion of the focusing lens (not shown) is calculated (step S78).

After the calculations are completed, it is determined whether 1RSW89 is in the ON state (step S79). If 1RSW89 is in the ON state (YES), it is determined whether 2RSW90 is in the ON state (step S80). On the other hand, if 1RSW89 is not in the ON state (NO), control returns to step S72.

If it has been determined in step S80 that 2RSW90 is in the ON state (YES), the lens driving section 83 protrudes the focusing lens according to the amount of lens protrusion determined in step S78 (step S81). On the other hand, if 2RSW90 is not in the ON state (NO), control returns to step S79.

Next, after the protrusion of the lens is completed, the shutter section 84 makes exposure according to the exposure control data obtained in step S77 (step S82). Thereafter, the film feeding section 85 rolls up one frame of the film. Then, control returns to step S72 again.

Figure 20:
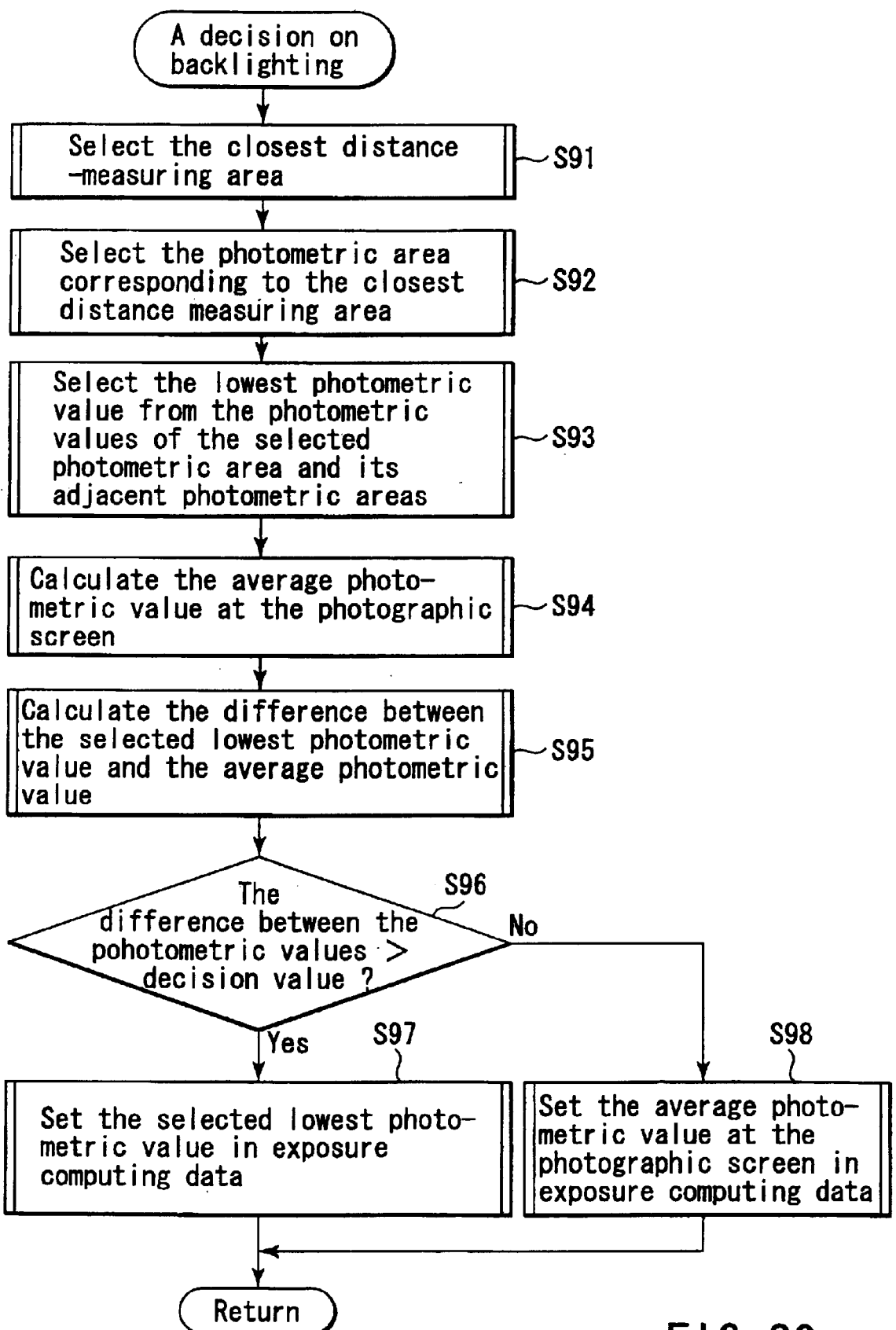
FIG. 20 is a flowchart to help explain a decision on backlighting in the fourth embodiment.

Referring to a flowchart shown in FIG. 20, a characteristic subroutine "backlight decision" in the fourth embodiment will be explained.

First, the closest distance-measuring data is found from the distance-measuring data about each of the distance-measuring areas on the photographic screen measured in step S75 of FIG. 19. Then, the distance-measuring area corresponding to the closest distance-measuring data is selected (step S91). Next, the photometric area corresponding to the selected distance-measuring area is selected (step S92). From the selected photometric area and its adjacent photometric areas, the lowest luminance photometric data is selected (step S93).

Next, from the photometric data about the individual photometric areas in step S74 of FIG. 19, the average photometric data ($B_{VAE}$AVE) on the photographic screen is determined (step S94). Furthermore, the difference between the lowest luminance photometric data selected in step S93 and the average photometric data found in step S94 is calculated (step S95).

Then, the difference between the lowest luminance photometric data and the average photometric data calculated in step S95 is compared with a specific backlight decision value (threshold value: GBVTH=2 EV) using expression (1) (step S96). In the comparison, if the difference in the photometric data ($B_{VAE}$AVE$-B_{VAE}$ 113) is larger than the backlight decision value (2: in the fourth embodiment), it is determined that the photographic scene is against light (YES) and the lowest luminance photometric data selected in step S93 is set in the exposure computing data (step S97). Thereafter, control returns to step S77 of FIG. 19. On the other hand, if the difference in the photometric data is not larger than the backlight decision value (NO), it is determined that the photographic scene is not against light and the average photometric data $B_{VAE}$AVE on the photographic screen found in step S94 is set directly in the exposure computing data (step S98). Thereafter, control returns to step S77 of FIG. 19.

Next the fifth embodiment of the present invention will be explained.

The fifth embodiment is a photometric unit whose configuration is equivalent to that of the fourth embodiment, and so an explanation of its configuration will be omitted.

To help understand the characteristics of the fifth embodiment, the image of a subject in photometry and distance measurement and the area where the image can be detected will be explained.

Figure 18:
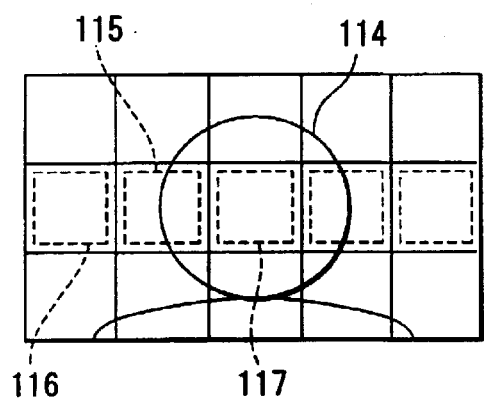
FIG. 18 shows the relationship between the photometric area and the distance-measuring area in the fifth embodiment.

FIG. 18 shows the relationship between the photometric area and the distance-measuring area in the fifth embodiment. In the areas for photometry and distance measurement, an image of a person 114, the main subject to be photographed, is emitted as shown in the figure. The areas for photometry and distance measurement are divided in a matrix on the finder screen (or image forming screen), which forms the following types of areas.

For distance-measuring data about each distance-measuring area, for example, there are a distance-measuring area 115 whose distance-measuring data indicates the closest distance and adjacent distance-measuring areas 116 and 117 on both sides of the distance-measuring area 115.

Here, an algorithm related to the processes up to a backlight decision will be explained.

For example, of a plurality of rectangular areas arranged in the middle in the longitudinal direction shown by broken lines in FIG. 18, the distance-measuring data about the distance-measuring area 115 indicates the closest distance, photometric data $B_{VAF}$ 115, $B_{VAF}$ 116, $B_{VAF}$ 117 are determined in the photometric area 115 and its adjacent photometric areas 116, 117. If their level relationship in luminance level meets the expression $B_{VAF}$ 117<$B_{VAF}$ 115<$B_{VAF}$ 116, photometric data $B_{VAF}$ 117 about the distance-measuring area 117 whose photometric data has the lowest luminance is selected.

Next, the average photometric data $B_{VAE}$AVE of the individual photometric areas is determined. When the difference between the average photometric data $B_{VAE}$AVE and the photometric data $B_{VAF}$ 117 selected as described above is larger than a backlight decision value GBvTH, it is determined that the photographic scene is against light.

Specifically, with the backlight decision value GBvTH=2 EV, if the following expression is met:

$$B_{VAE}AVE - B_{VAF}117 > 2 \quad (2)$$

it is determined that the photographic scene is against light.

If it has been determined that the photographic scene is against light, the strobe unit 86 is caused to emit light during exposure. If it has been determined that the photographic scene is not against light, the average photometric data $B_{VAE}AVE$ on the photographic screen is set as photometric data used in exposure calculations.

The operation and control in the fifth embodiment will be explained.

Figure 21:
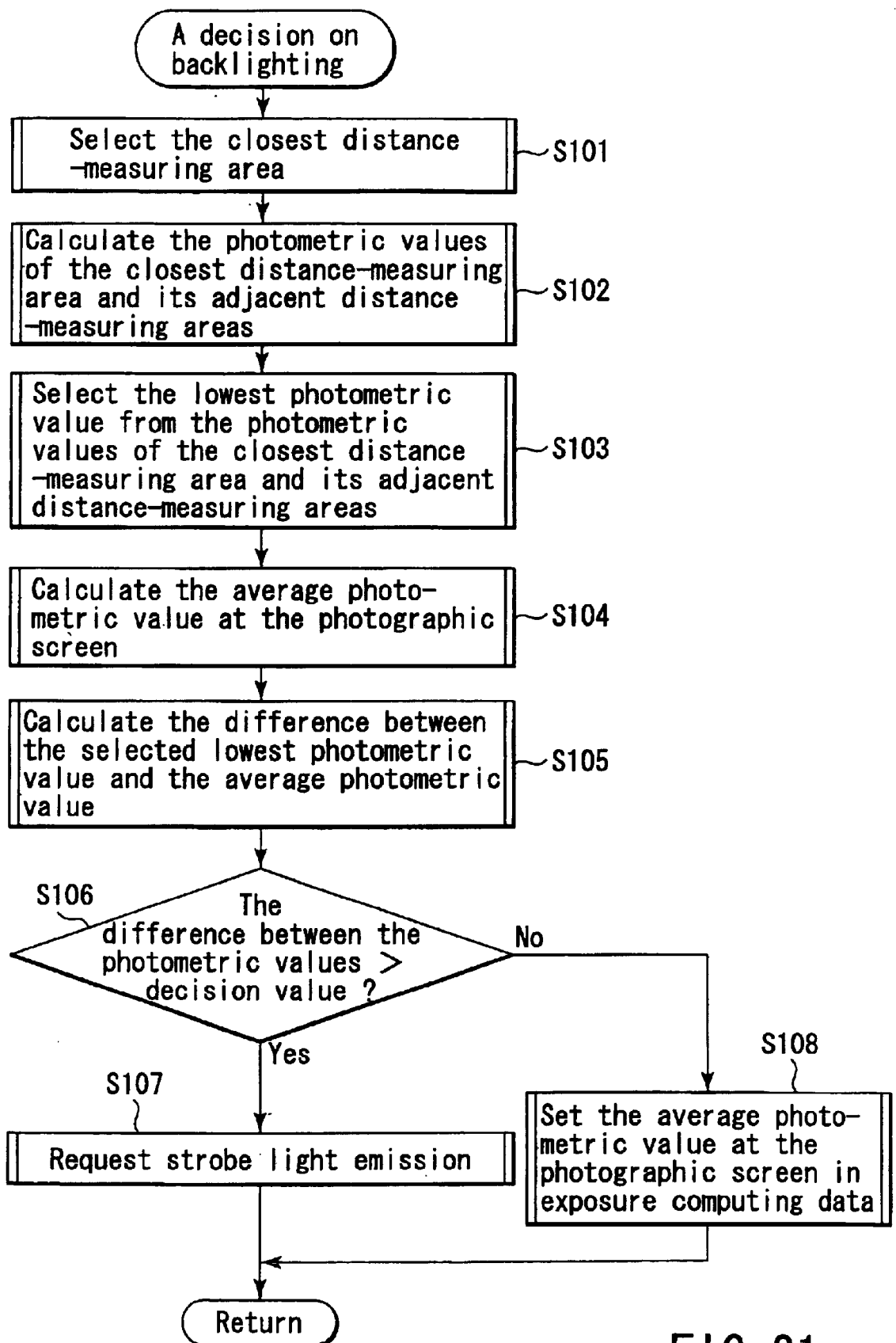
FIG. 21 is a flowchart to help explain a decision on backlighting in the fifth embodiment.

FIG. 21 is a flowchart for the sequence of a characteristic subroutine "backlight decision" in the fifth embodiment. FIG. 21 is a backlight decision subroutine in step S76 of FIG. 19.

First, from the distance-measuring data about the distance-measuring areas on the photographic screen measured in step S75 of FIG. 19, the closest distance-measuring data is found. The distance-measuring area corresponding to the closet distance-measuring data is selected (step S101). The photometric data about the selected distance-measuring area and the photometric data about its adjacent distance-measuring areas are found (step S102).

Next, from the photometric data found in step S102, the lowest luminance photometric data is selected (S103). From the photometric data about the photometric areas in step S74 of FIG. 19, the average photometric data ($B_{VAE}AVE$) on the photographic screen is calculated (step S104).

Next, the difference between the lowest luminance photometric data selected in step S103 and the average photometric data found in step S104 is calculated (step S105). The difference between the lowest luminance photometric data and the average photometric data calculated in step S105 is compared with the backlight decision value (GBVTH=2 EV) using the expression (2), thereby making a decision on which is larger or smaller (step S106).

If it has been determined that the difference in the photometric data is larger than the backlight decision value (2: in the fifth embodiment) (YES), it is determined that the photographic scene is against light. To deal with the backlighting state, strobe light emission request setting is done by, for example, setting a strobe light emission request flag at the strobe unit 86 (step S107). Thereafter, control returns to step S77 of FIG. 19. On the other hand, if the difference in the photometric data is not larger than the backlight decision value (NO), it is determined that the photographic scene is not against light and the average photometric data on the photographic screen obtained in step S104 is set directly in the exposure computing data (step S108). Thereafter, control returns to step S77 of FIG. 19.

As described above, with the fifth embodiment, the luminance of the main subject in making a decision on backlighting is found using the distance-measuring section 82, which not only produces a similar effect to that of the fourth embodiment but also can make a similar backlight decision without using the multidivisional photometric element 102 (FIG. 15) in the photometric section 81.

Next, the sixth embodiment of the present invention will be explained.

In the fourth and fifth embodiments, when it has been determined that the photographic scene is against light, the strobe unit 86 is caused to emit light during exposure. In actual photographing, however, there may be a case where a sufficient effect cannot be obtained even when supplementary light is supplied by the strobe unit 86, because of various conditions, including the photographic lens with a large FNo., the photographic scene with a long subject distance, and a low film sensitivity. Since the configuration of the sixth embodiment is equivalent to that of the fourth embodiment, its detailed explanation will be omitted.

In the sixth embodiment, when it is determined that the photographic scene is against light and supplementary light from the strobe unit 86 cannot produce an acceptable effect, exposure control is performed on the basis of the lowest luminance photometric data selected from the photometric area corresponding to the closest distance-measuring area and its adjacent photometric areas.

Figure 22:
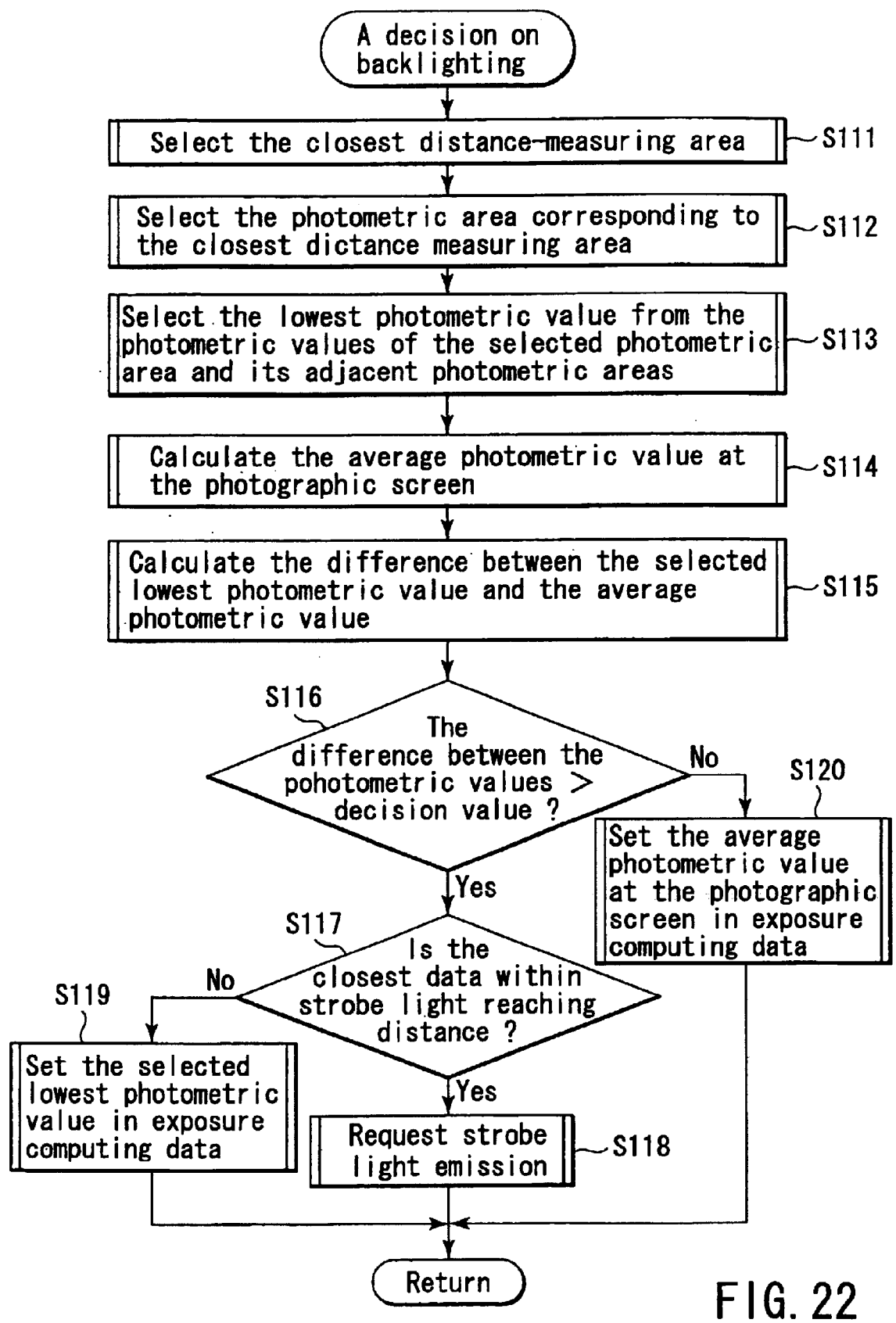
FIG. 22 is a flowchart to help explain a decision on backlighting in the sixth embodiment.

A decision on backlighting in the sixth embodiment will be explained by reference to a flowchart show in FIG. 22. FIG. 22 shows a subroutine for a decision on backlighting in step S76 of FIG. 19.

First, from the distance-measuring data about the distance-measuring areas on the photographic screen measured in step S75 of FIG. 19, the closest distance-measuring data is found. Then, the distance-measuring area indicating the value of the closest distance-measuring data is selected (step S111). The photometric area corresponding to the selected distance-measuring area is selected (step S112).

From the photometric area selected in step S112 and its adjacent photometric areas, the lowest luminance photometric data is selected (step S113). From the photometric data about the individual photometric areas in step S74 of FIG. 19, the average photometric data on the photographic screen is found (step S114). Furthermore, the difference between the lowest luminance photometric data selected in step S113 and the average photometric data found in step S114 is calculated (step S115).

Next, the difference between the lowest luminance photometric data and the average photometric data calculated in step S115 is compared with the backlight decision value (step S116). In the comparison, if the difference in the photometric data is larger than the backlight decision value (YES), it is determined that the photographic scene is against light. Furthermore, the effect of emitting supplementary light from the strobe unit 86 in the backlighting state is estimated (step S117). That is, it is determined whether the closest distance-measuring data is within strobe light reaching distance is determined, taking into account the FNo. of the photographic lens and the film sensitivity. On the other hand, if the comparison in step S116 has shown that the difference in the photometric data is not larger than the backlight decision value (NO), it is determined that the photographic scene is not against light and the average photometric data on the photographic scene found in step S114 is set in the exposure computing data (step S120). Thereafter, control returns to step S77 of FIG. 19.

In step S117, if the closest distance-measuring data is within strobe light reaching distance (YES), it is determined that supplementary light will produce effects. Then, strobe light emission request setting is done by setting a light emission request flag in the strobe unit 86 (step S118). Thereafter, control returns to step S77 of FIG. 19. On the other hand, if the closest distance-measuring data is not within strobe light reaching distance (NO), the lowest luminance photometric data selected in step S113 is set in the exposure computing data (step S119). Thereafter, control returns to step S77 of FIG. 19.

As described above, with the sixth embodiment, since it is determined whether the value of the obtained closest distance-measuring data is within strobe light reaching, taking into account the FNo. of the photographic lens and the film sensitivity, the effect of strobe light can be estimated. Therefore, even when the emission of light from the strobe unit 86 doesn't seem to have any effect in the backlighting scene, the main subject can be photographed with as proper exposure as possible by setting the lowest luminance photometric data in the exposure computing data.

Next, the seventh embodiment of the present invention will be explained.

Figure 23:
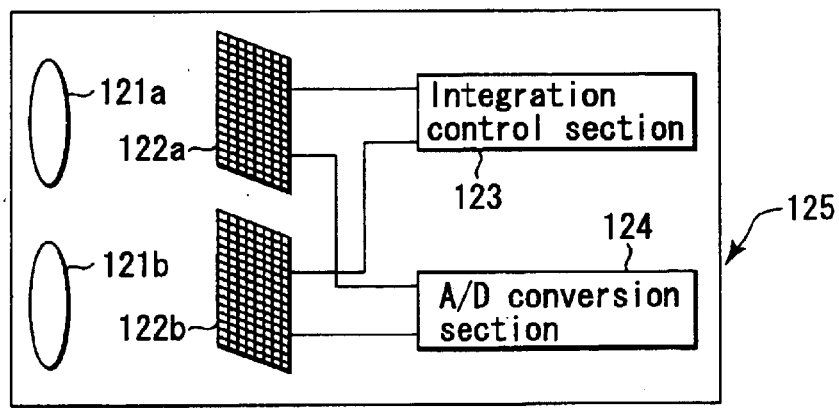
FIG. 23 schematically shows a configuration of the photometric and distance-measuring section in the seventh embodiment.

FIG. 23 schematically shows the configuration of a photometric section and a distance-measuring section in the seventh embodiment. The seventh embodiment is characterized by using a pair of area sensors 122a, 122b as shown in FIG. 23 in place of the distance-measuring section 82. Photometry is performed using one of the area sensors 122a, 122b.

A photometric distance-measuring section 125 in the seventh embodiment measures subject luminance data and subject image data. The photometric distance-measuring section 125, which has the functions of the photometric section 81 and distance-measuring 82, is an integral photometric distance-measuring unit sharing a sensor function. The photometric distance-measuring section 125 is composed of a set of light-receiving lenses 121a, 121b, area sensors 122a, 122b, an integration control section 123, and an A/D conversion section 124.

Of these, the light-receiving lenses 121a, 121b form a subject image on the light-receiving surface of the area sensors 122a, 122b. The area sensors 122a, 122b photoelectrically convert the subject image formed on the light-receiving surface and produce an electric signal (photometric data or subject image signal) according to the light intensity. The integration control section 123 performs control related-to the integrating operation of the area sensors 122a, 122b. The A/D conversion section 124 reads the photometric data or subject image signal produced by the area sensors 122a, 122b and converts the data or analog signal into a digital signal.

That is, in place of the line sensors (106a, 106b) used in the distance-measuring section 82, the area sensors 122a, 122b are used for distance measurements. At least one of the area sensors is used for photometry.

With this configuration, distance measurement and photometry are performed as described above. The processing sequence of distance measurement and photometry conform to that in the aforementioned embodiments and its detailed explanation will be omitted. In photometry, two-dimensional photometric processing can be done using an area sensor. Therefore, for example, the photometric areas for the main subject may be set arbitrarily in a two-dimensional space (or two-dimensionally). The photometric points may be designed to be compatible with multi-points, if necessary.

As described above, with the seventh embodiment, the photometric section 81 becomes unnecessary and the photometric section and distance-measuring section share the light-receiving element (area sensor), which makes it possible to provide an integral photometric distance-measuring unit. Sharing the light-receiving element eliminates parallax in the photometric visual field and distance-measuring visual field. Therefore, the seventh embodiment has a spatial merit and enables a higher-accuracy backlight decision to be made than a conventional equivalent.

Explanation has been given using a camera capable of photometry and distance measurement as an example. The subject matter of the present invention may be applied similarly to devices other than cameras. The invention, of course, may be applied similarly to a single device unit, such as a photometric distance-measuring unit.

Next, an eighth embodiment of the present invention will be explained.

Figures 24, 25:
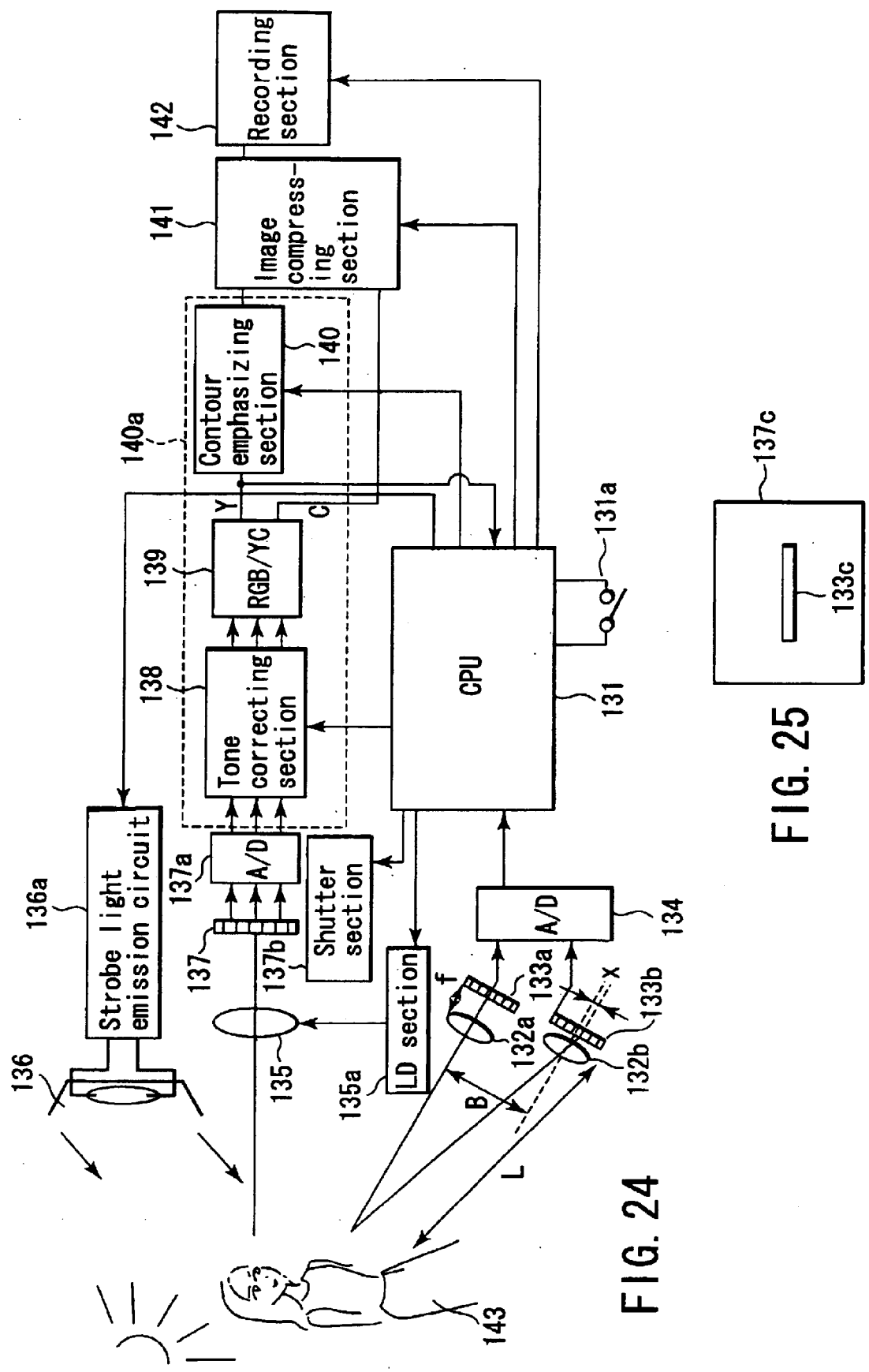
FIG. 24 is a block diagram of a camera according to an eighth embodiment of the present invention.
FIG. 25 is a diagram to help explain the sensor array and the monitoring range of the imaging section.

FIG. 24 is a block diagram of a camera according to the eighth embodiment. First, the image of a subject (person) 143 is formed by a photographic lens 135. The image enters an imaging section 137. the imaging section 137 separates the image of the subject 143 into three kinds of color components (i.e., RGB components) and integrates them. The amounts of integration corresponding to the respective color components are outputted as subject image signals to an analog/digital (A/D) conversion section 137a. The A/D conversion section 137a converts the inputted integration output into digital quantity and outputs the digital signal to an image processing section 140a.

The digital integration output (hereinafter, referred to as image data) inputted to the image processing section 140a is subjected to tone correction at a tone correcting section 138. The tone correction is known as a gamma ($\gamma$) conversion process. In the tone correction, the $\gamma$ value in the tone curve of the inputted data is corrected, thereby making the brightness of the image proper. The tone correcting section 138 emphasizes the dark part or the bright part, which makes natural the distribution of brightness of the screen visible to our eyes in reproducing the image.

After the tone is corrected by the tone correcting section 138, the tone correcting section 138 supplies its output to an RGB signal/YC signal (RGB/YC) converting section 139. The RGB/YC converting section 139 converts the image data inputted in the form of a RGB component signal into a luminance (Y) signal and a color coordinate ($C_R$, $C_B$) signal. Of the signals converted into the YC components, the luminance signal is outputted to a contour emphasizing section 140 and the color coordinate signal is outputted to an image compressing section 141.

The contour emphasizing section 140 carries out a contour emphasizing process of emphasizing the high contrast part of the inputted image (generally knows as a sharpness process). The contour emphasizing process will be explained later.

The image thus processed is inputted from the image processing section 140a to the image compressing section 141. The image compressing section 141 compresses the inputted image using JPEG or the like and then records the compressed image into a recording section 142.

As described above, the photographed image is recorded into the recording section 142 digitally. Such a series of image processes are carried out by a computing section (CPU) 131 composed of a one-chip microcomputer or the like. The CPU 131 also performs photographing control of the camera. The CPU 131 includes the functions of the backlighting state judgment section and image processing section.

According to the signal from the CPU 131, the shutter section 137b controls the charge accumulation time of the imaging section 137 composed of CCD or the like. Before photographing, the CPU 131 focuses the photographic lens 135 via a photographic lens driving (LD) section 135a. Focusing may be done on the basis of the subject distance data obtained from the output of an A/D converting section 134. Alternatively, focusing may be done on the basis of the peak value of the contrast signal obtained from the image processing section 140a. The image processing section 140a produces the contrast signal by displacing the photographic lens 135 little by little.

The subject distance is calculated as follows. First, the images of the subject 143 obtained via the two light-receiving lenses 132a, 132b provided the base length (parallax) B apart are formed on the sensor arrays 133a, 133b. At this time, from the image position difference x of the image of the subject 143 based on the parallax of the light-receiving lenses 132a, 132b, the CPU 131 calculates the subject distance according to the principle of trigonometrical distance measurements.

Use of the image (hereinafter, referred to as the image signal) of the subject 143 formed on the sensor arrays 133a, 133b or the imaging section 137 makes it possible to check if the subject 143 is dark or against light.

Figure 26A:
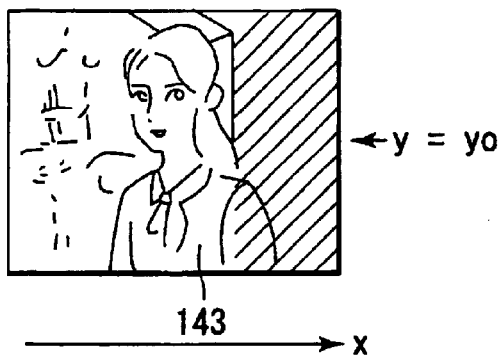
FIG. 26A shows an example of a backlit scene.

Specifically, the subject 143 often exists in the middle of the screen in terms of probability. In the case of FIG. 26A, since the image at left is brighter than in the middle, it can be determined that the subject is against light.

Furthermore, if the image data is low in luminance even after a specific time of integration, or after the charge is accumulated, it can be determined that the subject has a low luminance. The higher the intensity of the incident light is, the larger photoelectric current the sensor arrays 133a, 133b and the imaging section 137 generate. Therefore, when the photoelectric current is integrated to a specific capacity, the brighter the part, the larger the integration value, or the darker the part, the smaller the integration value.

In FIG. 24, the distance-measuring unit is composed of the light-receiving lenses 132a, 132b, sensor arrays 133a, 133b, and A/D converting section 134. The distance-measuring unit sets the subject existing at the point indicating the closest distance as the main subject and determines whether the subject is bright or dark on the basis of the brightness of the point. That is, the distance-measuring unit determines whether the subject is against light, on the basis of the comparison with the integration values of the surroundings.

FIG. 25 shows the region monitored by both of the sensor arrays as region 133c and the region monitored by the imaging section 137 as region 137c. When the subject 143 is dark or against light, a strobe light emission circuit 136a performs light emission control of a strobe light emission section 136, thereby supplementing the exposure of the subject 143.

Figure 26B:
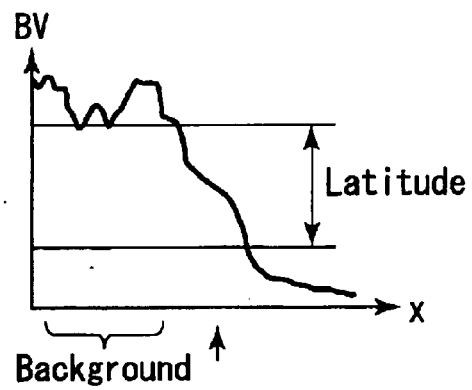
FIG. 26B is a distribution diagram of brightness in the photographic scene of FIG. 26A.

Next, FIG. 26A shows an example of the photographic scene supposed in the eighth embodiment. When the person 143, the main subject, is against light, the luminance difference between the background and the person becomes larger. At this time, in FIG. 26A, for example, when the brightness in the x-direction with respect to the position of a specific coordinate y0 in the vertical direction of the photographic screen is monitored, the characteristic as shown in FIG. 26B is obtained. In the FIG. 26B, the position corresponding to the background is bright and the position corresponding to the person 143 is dark. At this time, since the photographic scene of FIG. 26A is against light, the left half of the person 143 influenced by outdoor light is bright and the right half of the person 143 inside the house is dark. In such a case, when exposure is made so that the subject may lie within the permitted luminance range, there is a possibility that the contour of either the background or the person will disappear. In such a state, when the above-described contour emphasizing process or γ conversion process is carried out, an erroneous contour appears, noise occurs in the dark part, or the bright part disappear in white, which results in an unnatural image.

Figure 27A:
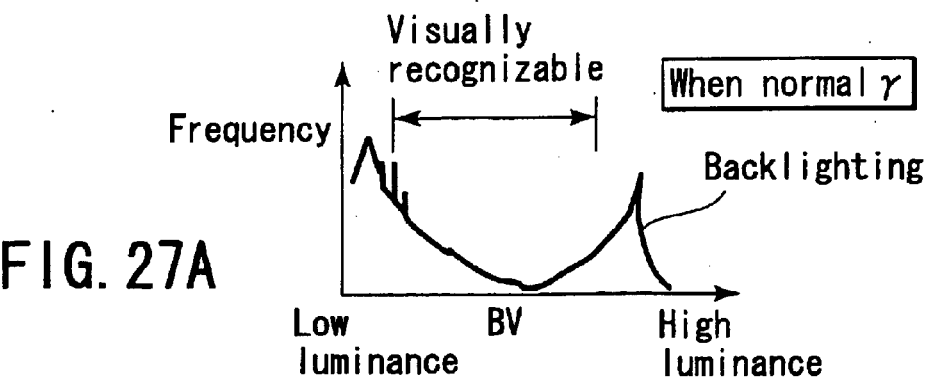
FIG. 27A is a histogram of brightness when the γ value is normal.
Figure 27B:
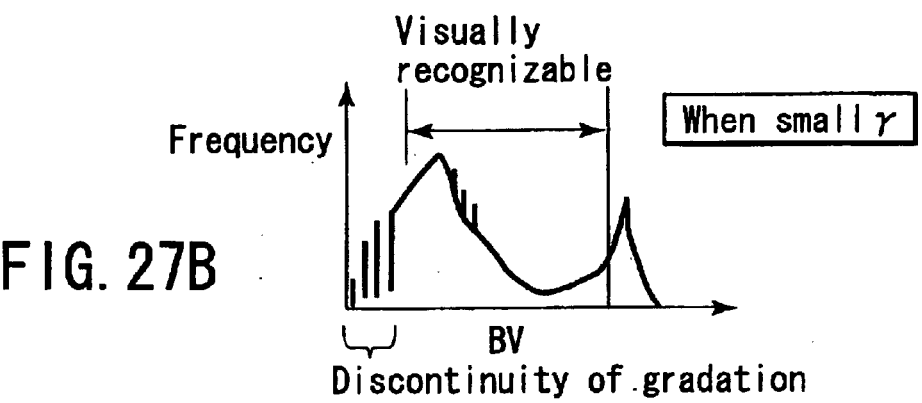
FIG. 27B is a histogram of brightness when the γ value is made smaller.

This will be explained in more detail by reference to a histogram shown in FIG. 27A. In FIG. 27A, the abscissa axis indicates brightness (luminance) Bv and the ordinate axis indicates in frequency how many pixels of the brightness indicated by the abscissa axis there are. Since in a backlighting scene, the difference in brightness between the bright part and the dark part is large, the ratio of the number of pixels outputting bright data to the total number of pixels and the ratio of the number of pixels outputting dark data to the total number of pixels are high, whereas the number of pixels outputting intermediate data is small. As a result, a larger part of the image cannot be recognized visually. When the γ conversion process is performed on FIG. 27A so as to decrease the γ value, the result is as shown in FIG. 27B.

The γ conversion process at that time will be explained by reference to FIG. 29.

Figure 29:
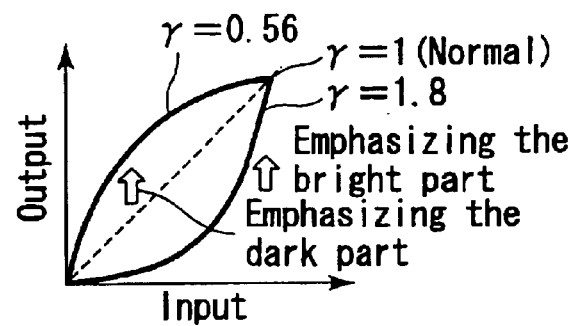
FIG. 29 is an explanatory diagram about a γ conversion process.

FIG. 29 shows how the brightness of the input and output images varies according to the γ value in the γ conversion process. Specifically, when the γ value becomes small (in the figure, γ=0.56), the dark part of the image is emphasized, making it easier to see a change in the dark part of the image. The bright part of the image is corrected so that a change in the bright part may be weakened. On the other hand, when the γ value becomes large (in the figure, γ=1.8), the dark part of the image gets darker, being painted over with black, and a change in the bright part of the image is emphasized.

Therefore, when FIG. 27A is subjected to the γ conversion process to decrease the γ value, the dark part in FIG. 27A is emphasized, with the result that the emphasized part lies in the visually recognizable range. From the beginning, the dark part has a small signal quantity and therefore the noise-to-signal ratio is relatively high. When the dark part is emphasized in such a case, the noise component of the signal is emphasized, too. This impairs the discontinuity of gradation, rendering the image undergone γ-conversion even worse.

Figure 26C:
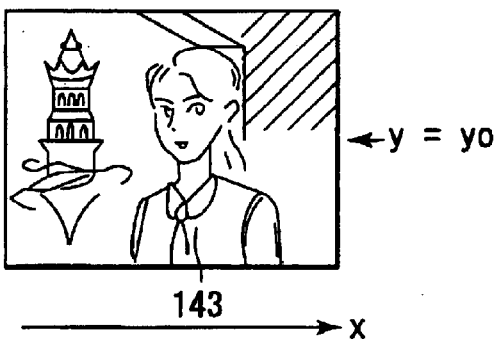
FIG. 26C shows an example of the photographic scene after strobe light is emitted onto the photographic scene of FIG. 26A.
Figure 28:
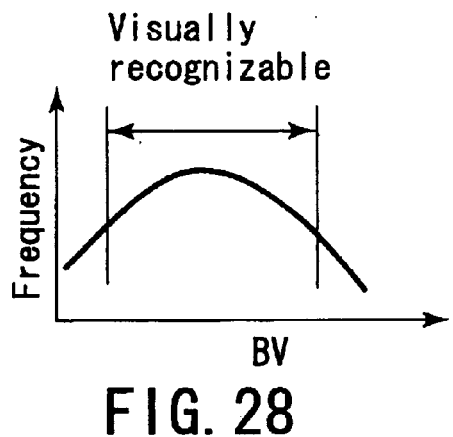
FIG. 28 is a distribution diagram of brightness when the photographic scene is not against light.

In the eighth embodiment, to overcome this problem, the strobe light emission section 136 is caused to emit light in the photographic scene as shown in FIG. 26A, thereby obtaining an image as shown in FIG. 26C, that is, such an image as brings both the background and the main subject into the visually recognizable range, not an image against light as shown in FIG. 28.

Figure 26D:
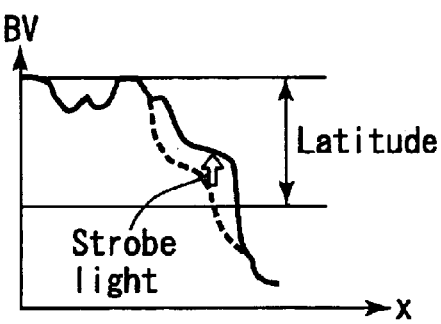
FIG. 26D is a distribution diagram of brightness in the scene of FIG. 26C.
Figure 27C:
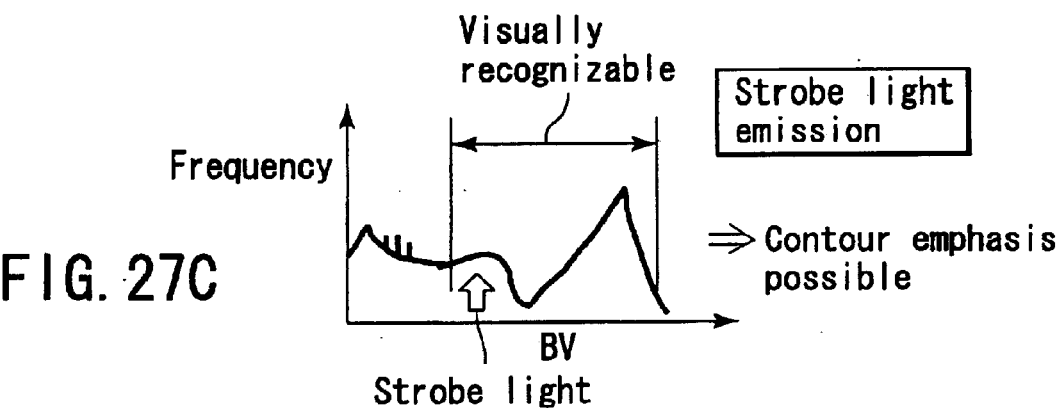
FIG. 27C is a histogram of brightness after the emission of strobe light.
Figure 27D:
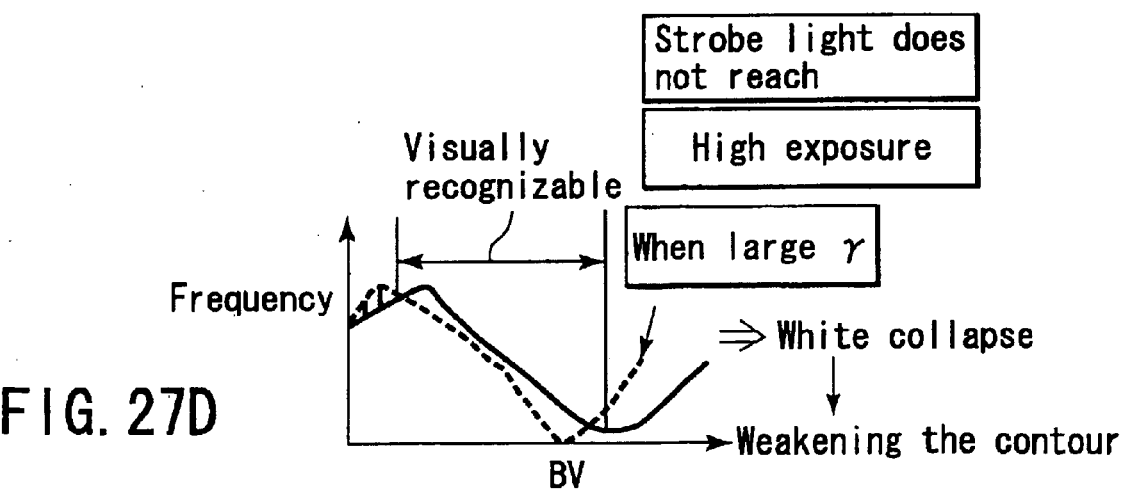
FIG. 27D is a histogram of brightness when the γ value is made larger when strobe light has not reached the subject.

That is, when a luminance distribution with a large luminance difference as shown in FIG. 26B or a histogram as shown in FIG. 27A has been obtained from the sensor arrays 133a, 133b or the imaging section 137, strobe light is emitted and the light quantity at the main subject is supplemented as shown in FIG. 26D, thereby raising the luminance distribution, which brings the background and the image of the person into a specific latitude. In the histogram, the intermediate brightness is increased with the supplementary light from the strobe unit as shown in FIG. 27C, which makes it possible to record the image with exposure sacrificing the dark part. In this case, it is not necessary to emphasize a specific brightness in the γ conversion process. Therefore, the contour emphasizing process is a normal one.

Figure 30A:
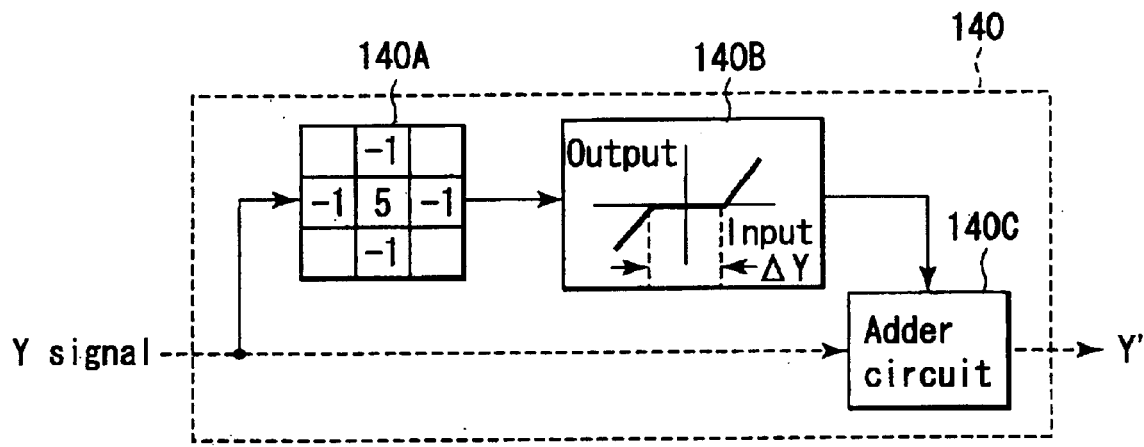
FIG. 30A shows a functional configuration of the contour emphasizing section and FIG. 30B is a diagram to help explain contour emphasizing calculation.
Figure 30B:
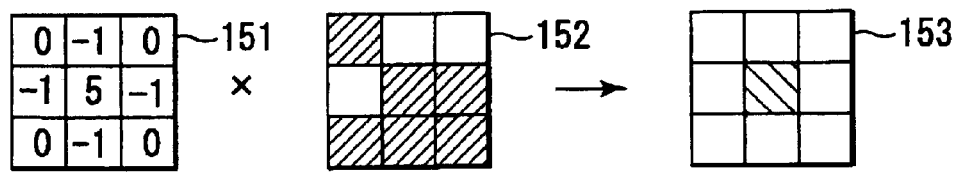

The contour emphasizing process will be explained in more detail by reference to FIGS. 30A and 30B. FIG. 30A shows the processes carried out in the contour emphasizing section 140 of FIG. 24 from a functional viewpoint.

When the luminance signal data (input Y in FIG. 30A) 152 converted at the RGB/YC converting section 139 is inputted to the contour emphasizing section 140, a contour component extracting circuit 140A in the contour emphasizing section does Laplacian calculation of the inputted luminance signal data 152 using a sharpening filter matrix 151 (FIG. 30B) As a result, the image data whose central part is emphasized, or the contour signal data 153, is created. The contour signal data 153 contained the noise component of the luminance signal data 152, which has been emphasized. Thus, the image will appear unnatural if the contour emphasis is performed by using the contour signal data 153 acquired for all pixels. Therefore, a limiting circuit 140B prevents the result of calculations lower than a specific contrast, or less than ΔY in the figure from being inputted to an adder circuit 140C.

On the other hand, the luminance signal data 152 is also inputted to the adder circuit 140C, with the result that the combination of the luminance signal date 152 and the contour signal data 153 becomes the final output Y' of the contour emphasizing section 140.

By changing the invariables in the sharpening filter matrix, the degree of contour emphasis can be changed. In addition, the degree of contour emphasis is also changed by changing ΔY in the limiting circuit 140B. In this case, making ΔY larger causes contour emphasis to be decreased, whereas making ΔY smaller causes contour emphasis to be increased.

Since there is a limit to the guide number showing the relationship between the strobe light reaching distance and the stop of the camera, when the subject distance is too far, the main subject cannot be brought into a sufficient brightness, no matter how strong the strobe light is. As a result, an image as shown in FIG. 26E appears.

Figure 26E:
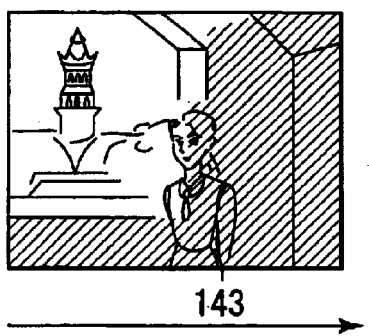
FIG. 26E shows a photographic scene when strobe light has not reached the subject.
Figure 26F:
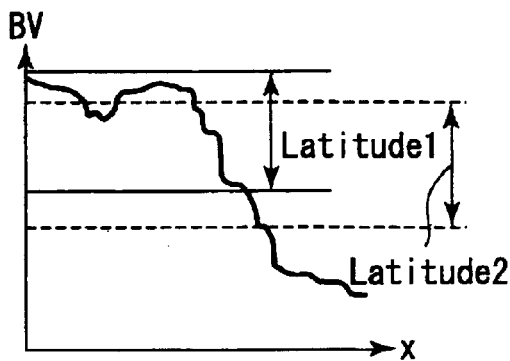
FIG. 26F is a distribution diagram of brightness in the photographic scene of FIG. 26E.

As described above, when the strobe light does not reach the main subject, exposure is made so as to bring only the bright part into latitude 1 of FIG. 26F, with the result that the face of the person 143 becomes pitch-dark at the cost of the background photographed properly as shown in FIG. 26E. Thus, in such a scene, exposure is made on the overexposure side, that is, in latitude 2 of FIG. 26F, which permits the face of the person 143 to be photographed properly. Then, in the γ conversion process, the γ value is made larger to emphasize the bright part, or a change in the luminance of the background, so that the image of the background may not collapse. At this time, since the large luminance difference still remains, contour emphasis would make the image unnatural. Therefore, contour emphasis is caused to weaken.

Figure 31A:
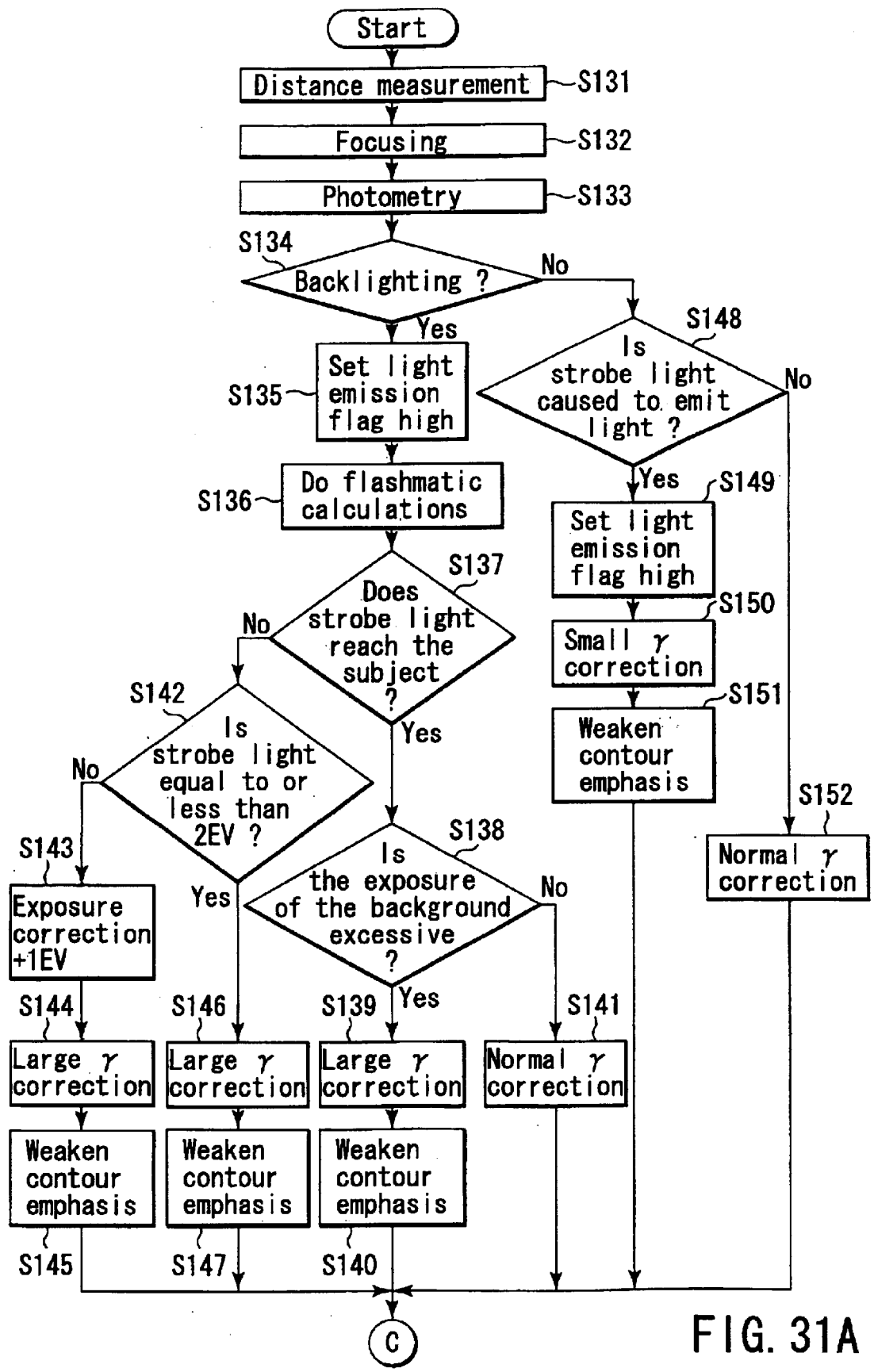
FIGS. 31A and 31B are flowcharts to help explain the sequence of photographing control of the camera related to the eighth embodiment.
Figure 31B:
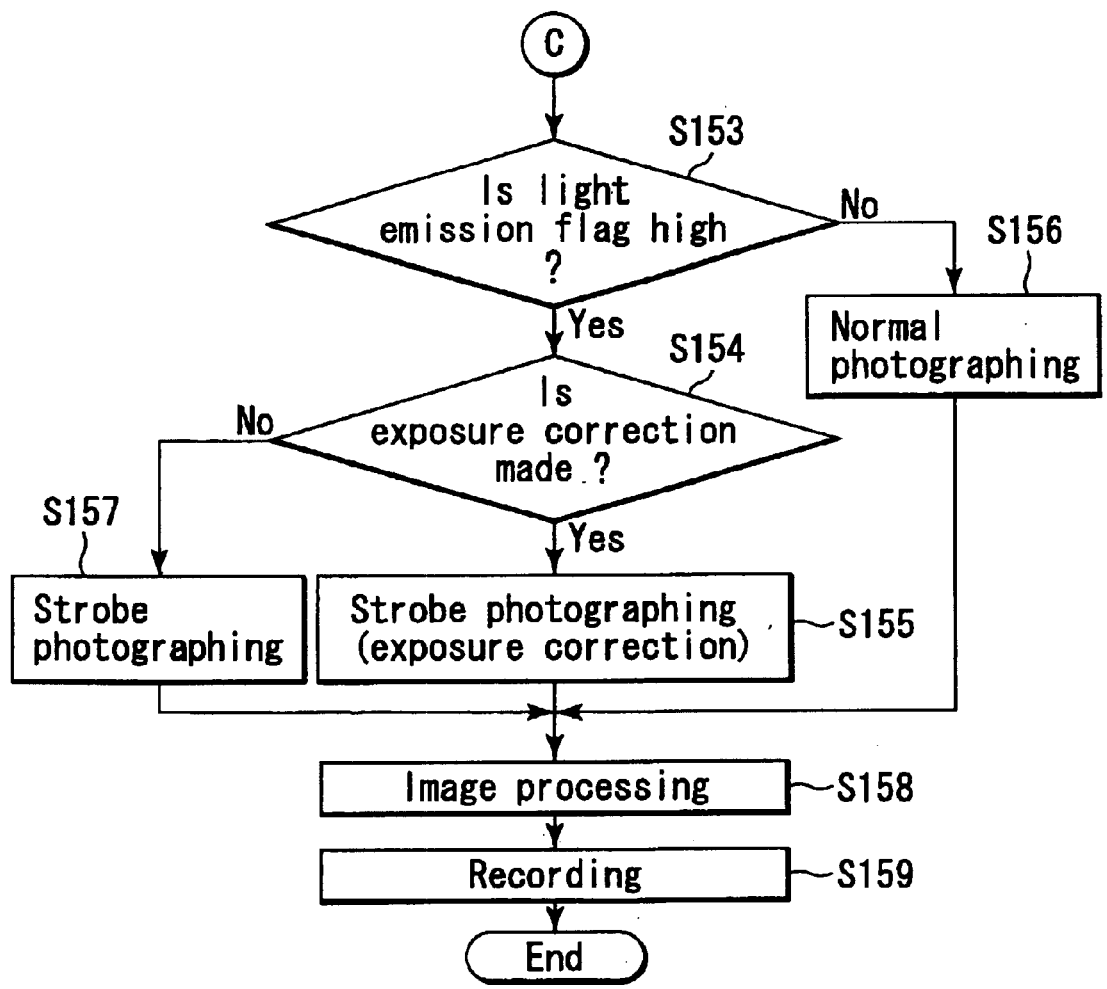

Referring to a flowchart shown in FIG. 31, the sequence of photographing control performed by the CPU 131 based on the aforementioned idea will be explained.

First, when photographing control is started, distance measurement to calculate the subject distance is made to determine a photographic scene in photographing (step S131). Next, on the basis of the calculated subject distance, the LD section 135a is controlled to focus the photographic lens 135 (step S132). In addition, photometry is performed to detect the brightness at the photographic screen and the distribution of brightness (step S133). Next, on the basis of the obtained data, it is determined whether the photographic scene is against light (step S134).

Specifically, if the image data about the main subject 143 formed on the sensor arrays 133a, 133b or imaging section 137 is much smaller than the image data about the background, it is determined that the photographic scene is against light. The method of detecting the main subject may be a method of detecting the distance distribution on the screen with the distance-measuring unit as described above and determining the thing indicating the closest distance to be the main subject. Alternatively, a known method may be used. This method is to detect the contour of the subject from the data generated by the imaging section 137. If the shape represents a man, the subject is determined to be the main subject.

If it has been determined in step S134 that the photographic scene is against light, the light emission flag of the strobe unit is set high (step S135). Then, from the subject distance obtained in step S131, the strobe light emission quantity GNo is calculated by a known flashmatic method (step S136). Next, when the strobe light emission section 136 has been caused to emit light, it is determined whether strobe light reaches the subject, that is, whether the subject distance obtained in step S131 is closer than the strobe light reaching distance (step S137).

If it has been determined in step S137 that strobe light reaches the subject (YES), it is determined from the background image data whether the exposure of the background exceeds a specific value (step S138).

In step S138, it is determined whether exposure is made so that the background can be visually recognized. That is, it is determined whether exposure is brought to such overexposure that the background cannot be visually recognized. More specifically, the determination is made on the basis of whether the amount of exposure of the background exceeds the upper limit of the latitude of the imaging section 137. Therefore, if the latitude of the imaging section 137 is ±2 EV, the specific amount is +2 EV. Then, it is determined whether exposure of the background exceeds +2 EV. In step S138, if it has been determined that exposure of the background exceeds the specific value (YES), setting is done in the γ conversion process so that the γ value is increased (step S139) and contour emphasis is weakened (step S140) and then control proceeds to step S153. Making the γ value larger prevents the background image from disappearing in white as described earlier. Since the background light can be blurred with the contour of the main subject, correction to weaken contour emphasis is made at the same time. On the other hand, in step S138, if it has been determined that exposure of the background does not exceed the specific amount (NO), setting is done so that correction is made with the normal γ value, that is, γ=1 (step S141) and then control goes to step S153. In this case, it is not necessary to change the setting of contour emphasis, because the brightness of the background image is balanced with that of the main subject.

In step S137, if it has been determined that strobe light does not reach the main subject (NO), it is determined whether the underexposure of the main subject is equal to or less than −2 EV under the irradiation of strobe light (step S142). In step S142, it is determined whether exposure is made so that the main subject can be visually recognized. That is, it is determined whether exposure is brought to such underexposure that the main subject cannot be visually recognized. The threshold of the determination is not limited to −2 EV and may be set so that it can be determined whether exposure is made so as to enable the main subject to be visually recognized. More specifically, the threshold can be determined on the basis of whether the amount of exposure of the main subject drops below the lower limit of the latitude of the imaging section 137. In the eighth embodiment, let the latitude of the imaging section 137 be ±2 EV. Thus, in step S142, it is determined whether the underexposure of the main subject is equal to or less then −2 EV. In step S142, if it has been determined that the underexposure is not equal to or less than −2 EV, setting is done so as to make an exposure correction of +1 EV (step S143), because the illumination of the main subject by strobe light is regarded as making almost no contribution to exposure. As a result, the dark part is made brighter.

This makes it possible to cause the amount of exposure of the main subject to lie within the latitude of the imaging section 137. The amount of corrected exposure is not restricted to +1 EV and may be determined so that, for example, the amount of exposure of the main subject may lie within the latitude of the imaging section 137. When exposure is corrected excessively, the high luminance part, such as the background, is overexposed. Therefore, the amount of corrected exposure may be determined so that the amount of exposure of the main subject and that of the background may lie within the latitude of the imaging section 137 according to the difference in the amount of exposure between the main subject and the background. Thereafter, setting is done so that the γ value may be increased (step S144) and contour emphasis may be decreased (step S145) and then control goes to step S153. On the other hand, in step S142, if it has been determined that the degree of the underexposure is equal to or less than −2 EV, setting is done so that the y value may be increased (step S146) and contour emphasis may be decreased (step S147) and then control goes to step S153.

Figure 32:
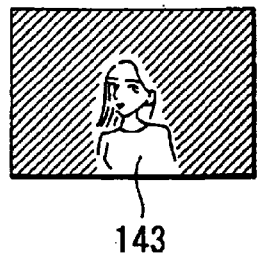
FIG. 32 is a diagram to help explain the assimilation of a person's hair and the background in the γ conversion process.

In step S134, if it has been determined that the photographic scene is not against light, it is determined from the photometric value that the strobe light emission section 136 is caused to emit light (step S148). If it has been determined that the strobe light emission section 136 is caused to emit light (YES), the light emission flag of the strobe unit is set high (step S149). Thereafter, setting is done so that the γ value may be decreased (step S150) and contour emphasis may be decreased (step S151) and then control goes to step S153. At this time, the γ value is made smaller and the dark part is made as bright as possible. In this case, however, since the hair of the person 143 often cannot be distinguished from the dark background as shown in FIG. 32, correction to weaken contour emphasis is made.

On the other hand, in step S148, if it has been determined that the strobe light emission section 136 is not caused to emit light (NO), setting is done so that a γ correction may be made with a normal γ value (step S152) and then control proceeds to step S153.

After the above operation, it is determined whether the light emission flag of the strobe unit is high (step S153). If it has been determined that the light emission flag of the strobe unit is high (YES), it is determined whether setting has been done to make an exposure correction (step S154). If it has been determined that setting has been done to make an exposure correction (YES), strobe photographing with an exposure correction is done (step S155) and then control goes to step S158. In step S153, if it has been determined that the light emission flag of the strobe unit is not high (NO), normal photographing without the light emission of the strobe light emission section 136 is done (step S156). Thereafter, control goes to step S158. In step S154, if it has been determined that setting has not been done so that an exposure correction may be made (NO), strobe photographing without an exposure correction is done (step S157) and then control proceeds to step S158.

After the image has been photographed by the above-described operations, the image processes, including the γ conversion process and contour emphasizing process, are carried out according to the aforementioned settings (step S158) and the photographed image is recorded into the recording section 142 (step S159). After the photographed image is recorded into the recording section 142, the photographing control sequence is completed.

As described above, with the eighth embodiment, light is supplemented by the strobe unit according to the state of the photographic scene (such as backlighting) and a proper exposure correction and image processing are selected automatically, thereby performing photographing control. Therefore, proper photographing can be done even in a photographic scene against light which would be difficult to reproduce in the prior art. Furthermore, since the photographer need not operate to make the correction, a camera excellent in snapshot capabilities can be provided.

Next, a ninth embodiment of the present invention will be explained by reference to FIG. 33.

In the ninth embodiment, instead of using a distance-measuring unit, or the sensor arrays 133a, 133b, and the like, the imaging section provided on the digital camera or the like, or the imaging section 137 of FIG. 24, is used to measure a distance. The CPU 131 in the ninth embodiment includes the functions of an illumination state judgment section and a control section. Since the remaining configuration and operation are the same as those in the eighth embodiment, explanation of them will be omitted.

Figure 33:
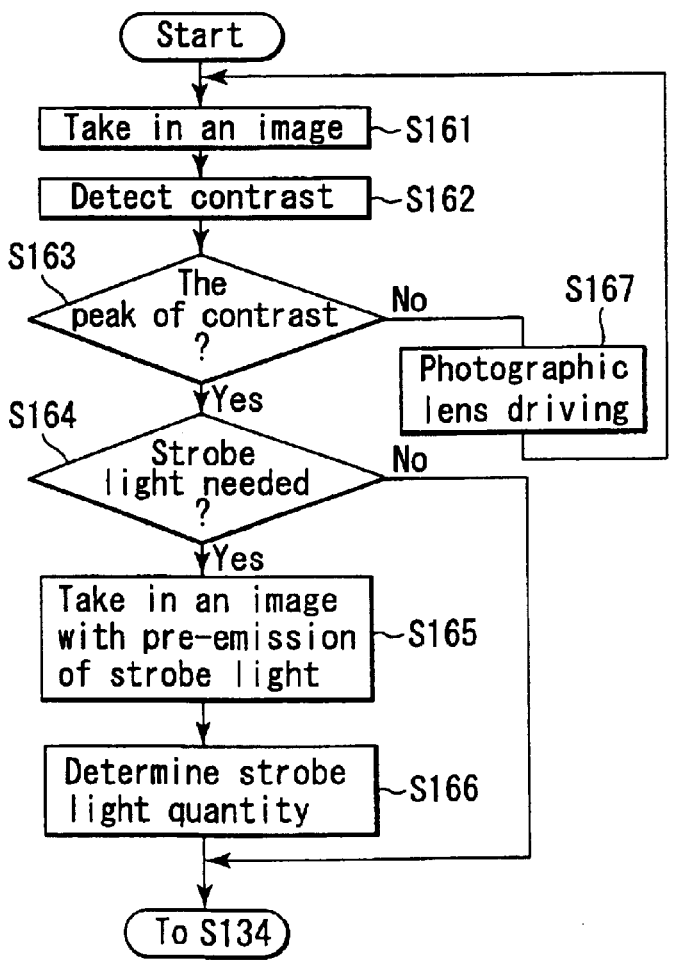
FIG. 33 is a flowchart to help explain the sequence of photographing control of a camera related to a ninth embodiment of the present invention.

FIG. 33 is a flowchart to help explain operation control before photographing is done with a camera according to the ninth embodiment. The operations subsequent to the flowchart are almost the same as those after step S134 in FIG. 31.

First, the CPU 131 takes in an image with the imaging section 137 (step S161). Then, the contrast of the taken-in image is detected (step S162). Next, it is determined whether the detected contrast is the peak of the contrast (step S163). If it has been determined that it is not the peak of the contrast (NO), the photographic lens 135 is driven minutely (step S167) and then control returns to step S161. These operations are repeated until the peak of the contrast has been detected.

On the other hand, if it has been determined in step S163 that the peak of the contrast has been detected (YES), it is determined from the brightness of the image whether the emission of strobe light is necessary (step S164). If it has been determined that the emission of strobe light is not necessary (NO), control exits the flowchart and proceeds to step S134 in FIG. 31. In subsequent processes, photographing is done without the light emission of the strobe light emission section 136.

In step S164, it has been determined that the emission of strobe light is necessary (YES), a pre-emission of a small quantity of light is carried out and the image at this time is taken in by the imaging section 137 (step S165). Comparing the image with the image taken in at step S161 enables the contribution rate of strobe light during photographing. From this, information as to whether strobe light reaches the subject during photographing or whether the exposure state by the irradiation of strobe light is in underexposure is estimated and then the proper amount of emission of strobe light is calculated (step S166). After the amount of emission of strobe light is calculated, control exits the flowchart and goes to step S134 in FIG. 31.

Figure 34A:
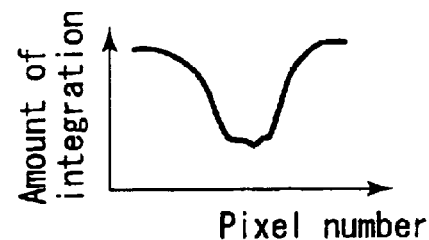
FIG. 34A is a positional distribution diagram of the amount of integration outputted from the imaging section before the emission of strobe light.
Figure 34B:
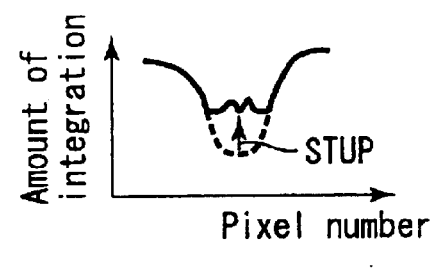
FIG. 34B is a positional distribution diagram of the amount of integration outputted from the imaging section when sufficient strobe light has not been emitted onto the main subject.
Figure 34C:
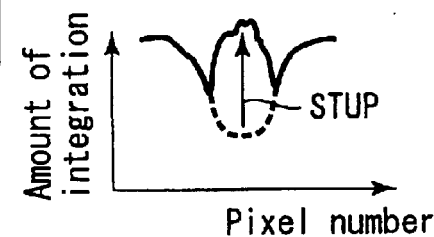
FIG. 34C is a positional distribution diagram of the amount of integration outputted from the imaging section when sufficient strobe light has been emitted onto the main subject.

For example, in step S161, if the amount of integration as shown in FIG. 34A, or the image data, is obtained, and the image data as shown in FIG. 34B or FIG. 34C is obtained with the pre-emission of light in step S164, the difference (indicated by STUP in the figure) between FIGS. 34A and 34B or FIGS. 34A and 34C indicates the rate of the contribution of strobe light.

After the pre-emission of light, when the image data in FIG. 34B is obtained, the central part, or the main subject, is less bright than the background. Therefore, since the strobe light is regarded as making no contribution, step S138 in FIG. 31 is branched to step S139. On the other hand, after the pre-emission of light, when the image data in FIG. 34C is obtained, the brightness of the background and that of the main subject are almost at the same level, so that step S138 in FIG. 31 is branched to step S141.

As explained above, with the ninth embodiment, suitable photographing control is performed according to the photographic scene with the imaging section of the digital camera without using a special distance-measuring unit. This makes it possible to photograph a backlighting scene which was difficult to reproduce in the prior art, without using a special distance-measuring unit.

Next, referring to FIGS. 35 to 38, a tenth embodiment of the present invention will be explained. The configuration of the tenth embodiment is achieved by applying an equivalent configuration to that of the eighth or ninth embodiment.

Figure 36A:
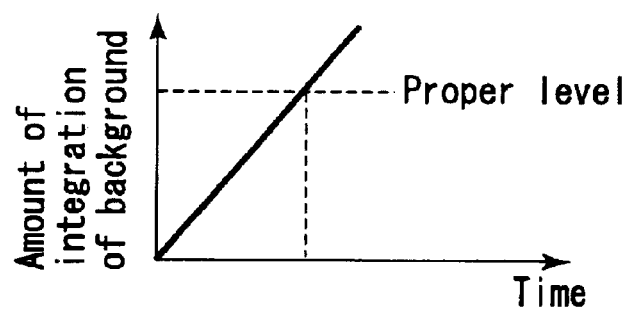
FIG. 36A shows a change in the amount of integration with respect to time of the background subject after the emission of strobe light and FIG. 36B shows a change in the amount of integration with respect to time of the main subject when sufficient strobe light has been emitted onto the main subject after the emission of strobe light.

In the tenth embodiment, when the photographic scene is against light and strobe light emission control is performed, control is performed so that the background and a person, the main subject, may have a proper brightness. This will be explained by reference to FIGS. 36A and 36B. FIG. 36A shows a change in the amount of integration of the background subject with respect to time after the emission of strobe light. At this time, the strobe light does not reach the background subject. Since the photographic scene is against light from the beginning, the background subject is exposed at the proper level for the proper exposure time even under only steady light components, such as natural light.

Figure 36B:
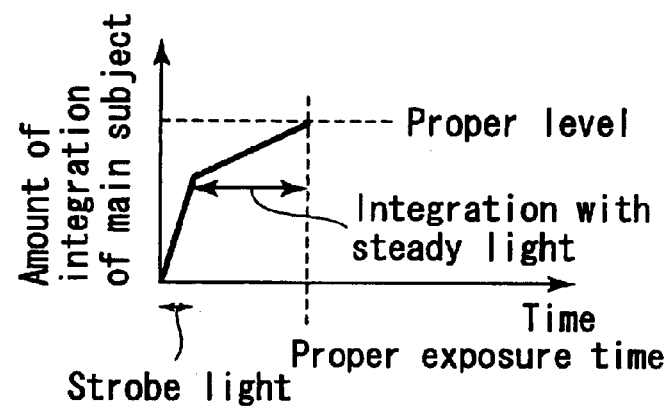

FIG. 36B shows a change in the amount of integration of the main subject with respect to time after the emission of strobe light. At this time, the steady light components of the main subject are supplemented with strobe light, which enables exposure to be made at the proper level for the proper exposure time.

Figure 37A:
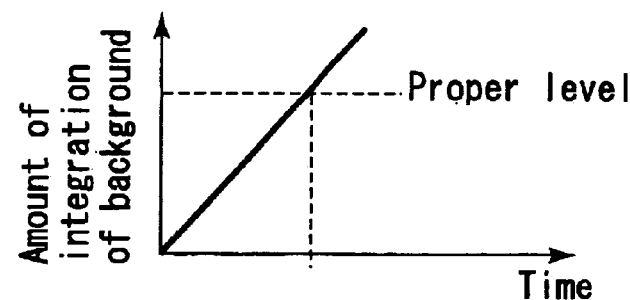
FIG. 37A shows a change in the amount of integration with respect to time of the background subject after the emission of strobe light and FIG. 37B shows a change in the amount of integration with respect to time of the main subject when sufficient strobe light has not been emitted onto the main subject after the emission of strobe light.
Figure 37B:
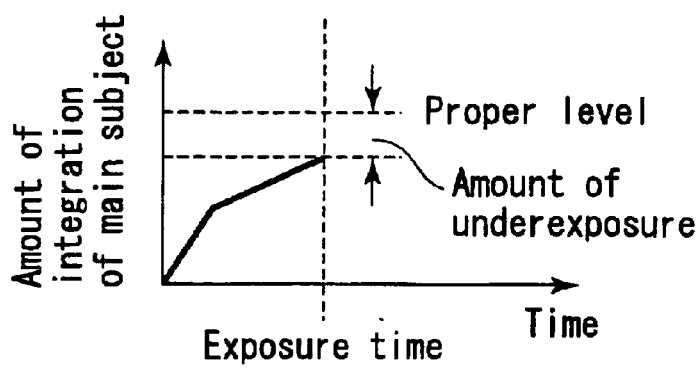

There is a limit to the amount of emission of strobe light. Therefore, only with steady light, such as natural light, it is possible that the main subject has not yet been exposed at the proper level, even when the background has been exposed at the proper level for the proper exposure time as shown in FIGS. 37A and 37B. In FIG. 37B, the difference between the amount of integration of the main subject and that of the background subject (at the proper exposure level) is represented as the amount of underexposure in FIG. 37B. The amount of underexposure can be estimated on the basis of the result of photometry and the result of distance measurement before photographing and the limit of guide number of the strobe unit.

Figure 38A:
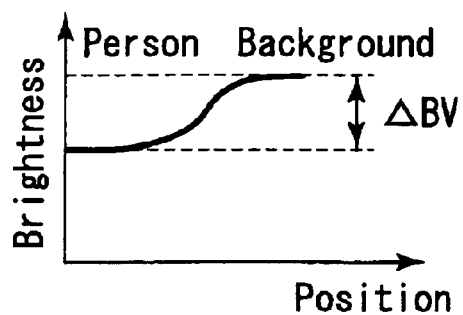
FIG. 38A is a positional distribution diagram of brightness when the brightness difference between the person and the background is small.
Figure 38B:
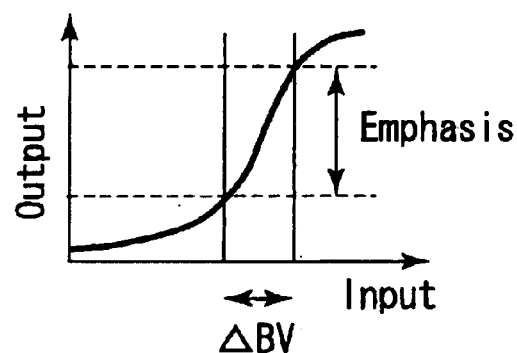
FIG. 38B is a diagram to help explain the γ conversion process in FIG. 38A.
Figure 38C:
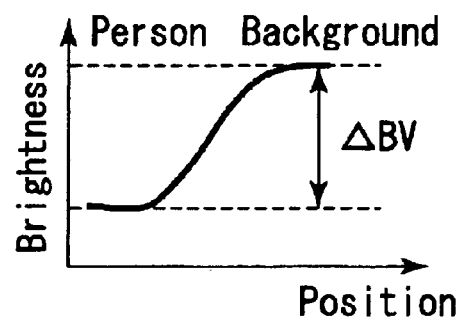
FIG. 38C is a positional distribution diagram of brightness when the brightness difference between the person and the background is large.

FIGS. 38A and 38C show examples of a change in the brightness from the position of the main subject to the position of the background. As described above, when the photographic scene is underexposed, the brightness difference $\Delta BV$ between the person, the main subject, and the background subject varies with the degree of underexposure. If the $\Delta BV$ is small, that is, if the photographic scene is as shown in FIG. 38A, the person and the background cannot be separated distinctly unless the minute change in the light quantity is emphasized. For this reason, correction is made by a $\gamma$ conversion process with the characteristic as shown in FIG. 38B. In addition, contour emphasis may be made.

Figure 38D:
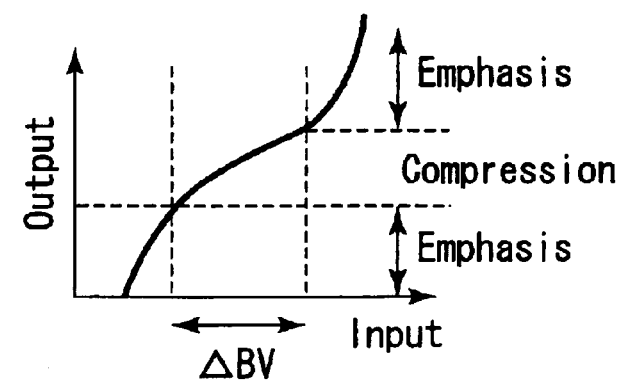
FIG. 38D is a diagram to help explain the γ conversion process in FIG. 38C.

On the other hand, when a balance in brightness between the background and the person is clearly bad, a $\gamma$ conversion process with the characteristic as shown in FIG. 38D is carried out, because compressing the changed part to emphasize the bright part improves a balance between the background and the person.

Figure 35:
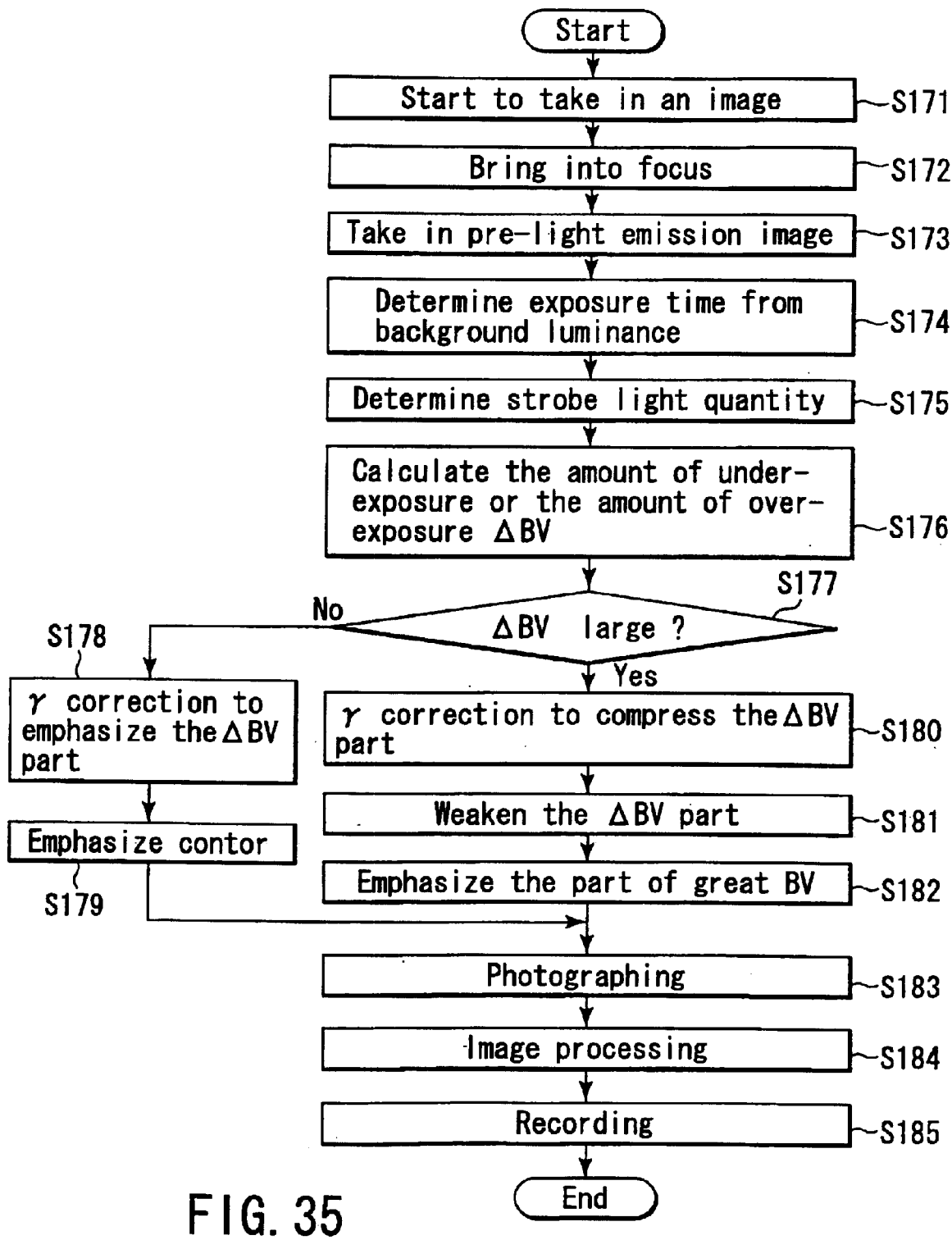
FIG. 35 is a flowchart to help explain the control sequence of backlight photographing with a camera related to a tenth embodiment of the present invention.

FIG. 35 shows a flowchart for photographing control in backlighting including switching control of the $\gamma$ conversion process. In the flowchart, explanation will be given, provided that the photographic scene is against light. Explanation of the process of making a decision on backlighting will be omitted.

First, the CPU 131 takes in an image with the imaging section 137 (step S171). Then, the photographic lens 135 is focused (step S172). The focusing may be done by the method of either the 8th or 9th embodiment. In the tenth embodiment, the method of the second embodiment is used.

Next, the strobe light emission section 136 is caused to emit light previously and the imaging section 137 takes in the image at that time (step S173). Next, the exposure time that brings the background subject to the proper exposure level is calculated (step S174). Thereafter, the amount of emission of light by the strobe unit necessary to bring the main subject to the proper exposure level is determined (step S175). Then, the brightness difference $\Delta BV$ between the main subject and the background subject is found (step S176).

Next, it is determined whether $\Delta BV$ is larger than a specific level (step S177). If $\Delta BV$ is equal to or less than the specific level, that is, if the photographic scene is as shown in FIG. 38A, setting is done so as to carry out a $\gamma$ conversion process with the characteristic of FIG. 38C to emphasize a change in $\Delta BV$ (step S178). Then, after setting is done so as to emphasize the contour near $\Delta BV$ (step S179), control proceeds to step S183.

On the other hand, if it has been determined in step S177 that $\Delta BV$ is larger than the specific level, that is, the photographic scene is as shown in FIG. 38C, setting is done so as to carry out a $\gamma$ conversion process with the characteristic of FIG. 38D to weaken (compress) a change in $\Delta BV$ (step S180) Furthermore, setting is done so as to weaken the contour near $\Delta BV$ (step S181). In this case, the bright part of the background can disappear in white. Therefore, after setting is done to emphasize the contour of the bright part (step S182), control goes to step S183.

After such operations, strobe photographing is done (step S183). Then, after the image is processed according to the above settings (step S184), the resulting image is recorded into the recording section 142 (step S185). After the image is recorded in the recording section 142, the backlight photographing control in the flowchart is completed.

As described above, with the tenth embodiment, the image processing is effected automatically on the basis of the difference in brightness between the background and the main subject during backlighting. This makes it possible to take a picture with a good balance in tone between the background and the subject.

Accordingly, with the present invention, it is possible to provide a camera which is capable of producing a natural image according to the photographic scene and excels in snapshot capabilities. The present invention is not limited to the above embodiments and may be practiced or embodied in still other ways without departing from the spirit or essential character thereof.

What is claimed is:

1. A camera comprising:
    a photometric section which measures a subject luminance in a plurality of photometric areas on a photographic screen;
    a distance-measuring section which measures a subject distance in a plurality of distance-measuring areas on the photographic screen;
    a first selecting section which selects one of the plurality of distance-measuring areas based on distance-measuring data corresponding to each distance-measuring area;
    a second selecting section which selects one of: (i) a photometric area corresponding to the selected distance-measuring area, and (ii) a photometric area adjacent to the photometric area corresponding to the selected distance measuring area, based on photometric data corresponding to each photometric area; and
    a backlight judgment section which makes a decision on backlighting by comparing photometric data corresponding to the selected photometric area with the photometric data corresponding to said each photometric area.

2. The camera according to claim 1, wherein the selected distance-measuring area is a distance-measuring area corresponding to distance-measuring data indicating a closest distance.

3. The camera according to claim 1, wherein the selected photometric area is a photometric area corresponding to photometric data indicating a lowest luminance.

4. The camera according to claim 1, wherein the photometric section and the distance-measuring section share a light-receiving section.

5. A camera comprising:

a photometric section which measures a subject luminance in a plurality of photometric areas on a photographic screen;

a distance-measuring section which measures a subject distance and a subject luminance in a plurality of distance-measuring areas on the photographic screen;

a first selecting section which selects one of the plurality of distance-measuring areas based on distance-measuring data corresponding to each distance-measuring area;

a second selecting section which selects one of: (i) the distance-measuring area selected by the first selecting section, and (ii) distance-measuring areas adjacent to the distance-measuring area selected by the first selecting section, based on photometric data corresponding to each distance-measuring area; and a backlight judgment section which makes a decision on backlighting by comparing photometric data corresponding to the distance-measuring area selected by the second selecting section with photometric data from the photometric section.

6. The camera according to claim 5, wherein the distance-measuring area selected by the first select section is a distance-measuring area corresponding to distance-measuring data indicating a closest distance.

7. The camera according to claim 5, wherein the distance-measuring area selected by the second selecting section is a distance-measuring area corresponding to distance-measuring data indicating a lowest luminance.

8. The camera according to claim 5, wherein the photometric section and the distance-measuring section share a light-receiving section.

* * * * *